US009705575B2

(12) United States Patent
Nam et al.

(10) Patent No.: US 9,705,575 B2
(45) Date of Patent: Jul. 11, 2017

(54) ADVANCED FEEDBACK AND REFERENCE SIGNAL TRANSMISSIONS FOR MIMO WIRELESS COMMUNICATION SYSTEMS

(71) Applicant: Samsung Electronics Co., Ltd, Suwon-si (KR)

(72) Inventors: Young-Han Nam, Plano, TX (US); Md. Saifur Rahman, Richardson, TX (US); Taeyoung Kim, Seoul (KR); Eko Onggosanusi, Allen, TX (US); Jeehwan Noh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/068,489

(22) Filed: Apr. 12, 2016

(65) Prior Publication Data
US 2016/0269084 A1 Sep. 15, 2016

Related U.S. Application Data

(60) Provisional application No. 62/132,949, filed on Mar. 13, 2015, provisional application No. 62/196,565, (Continued)

(51) Int. Cl.
*H04L 5/00* (2006.01)
*H04B 7/0417* (2017.01)
(Continued)

(52) U.S. Cl.
CPC ........ *H04B 7/0417* (2013.01); *H04B 7/0469* (2013.01); *H04B 7/0478* (2013.01); *H04B 7/0626* (2013.01); *H04B 7/0639* (2013.01)

(58) Field of Classification Search
CPC ... H04B 7/0417; H04B 7/0626; H04B 7/0639
See application file for complete search history.

(56) References Cited

U.S. PATENT DOCUMENTS

| 2011/0110455 | A1* | 5/2011 | Gaal | H04L 5/14 375/295 |
| 2011/0317748 | A1* | 12/2011 | Li | H04B 7/0417 375/219 |

(Continued)

OTHER PUBLICATIONS

ETSI TS 136 211 V12.4.0 ; LTE; Evolved Universal Terrestrial Radio Access (E-UTRA); Physical channels and modulation (3GPP TS 36.211 version 12.4.0 Release 12); (Feb. 2015)—126 Pages.

(Continued)

*Primary Examiner* — Dac Ha

(57) ABSTRACT

A user equipment (UE) capable of communicating with a base station includes a transceiver configured to receive a signal comprising a CSI process configuration, wherein the CSI process configuration comprises a plurality of CSI-RS resource configurations to identify CSI-RS resources, and a controller configured to derive a first PMI index, $i_{11}$ utilizing a first non-precoded CSI-RS on a first non-precoded CSI-RS resource, derive a second PMI index, $i_{12}$ utilizing a second non-precoded CSI-RS on a second non-precoded CSI-RS resource, derive a third PMI index, $i_2$ utilizing a beamformed CSI-RS on a beamformed CSI-RS resource, and cause the transceiver to transmit a CSI feedback comprising the three PMI indices $i_{11}$, $i_{12}$ and $i_2$ to the base station. A base station capable of communicating with UE a transmitter configured to transmit a signal comprising a CSI process configuration, wherein the CSI process configuration comprises a plurality of CSI-RS resource configurations.

20 Claims, 13 Drawing Sheets

Related U.S. Application Data filed on Jul. 24, 2015, provisional application No. 62/201,901, filed on Aug. 6, 2015, provisional application No. 62/286,151, filed on Jan. 22, 2016.

(51) Int. Cl.
*H04B 7/06* (2006.01)
*H04B 7/04* (2017.01)

(56) References Cited

U.S. PATENT DOCUMENTS

| | | | |
|---|---|---|---|
| 2014/0016496 A1* | 1/2014 | Su | H04B 7/0626 370/252 |
| 2014/0254508 A1 | 9/2014 | Krishnamurthy et al. | |
| 2015/0003271 A1 | 1/2015 | Park et al. | |
| 2015/0304076 A1* | 10/2015 | Lee | H04L 5/005 370/329 |
| 2016/0043843 A1* | 2/2016 | Liu | H04L 5/0048 370/329 |

OTHER PUBLICATIONS

ETSI TS 136 212 V12.3.0 LTE; Evolved Universal Terrestrial Radio Access (E-UTRA); Multiplexing and channel coding (3GPP TS 36.212 version 12.3.0 Release 12)—(Feb. 2015)—91 Pages.

ETSI TS 136 213 V12.4.0 LTE; Evolved Universal Terrestrial Radio Access (E-UTRA); Physical layer procedures (3GPP TS 36.213 version 12.4.0 Release 12)—(Feb. 2015)—227 Pages.

International Search Report dated Jun. 20, 2016 in connection with International Patent Application No. PCT/KR2016/002521.

Written Opinion of the International Searching Authority dated Jun. 20, 2016 in connection with International Patent Application No. PCT/KR2016/002521.

"Conclusions from offline ad-hoc session on AI 7.2.4.3.1 (CSI-RS and feedback enhancements for EBF/FD-MIMO)", Samsung, 3GPP TSG RAN WG1 Meeting #80, Feb. 9-13, 2015, 2 pages.

"CSI feedback enhancements and precoded CSI-RS for FD-MIMO", Samsung, 3GPP TSG RAN WG1 Meeting #80, 4 pages.

"WF on CSI-RS enhancements", Samsung, CHTTL, . . . , 3GPP TSG RAN1 #80, Feb. 9-13, 2015, 6 pages.

* cited by examiner

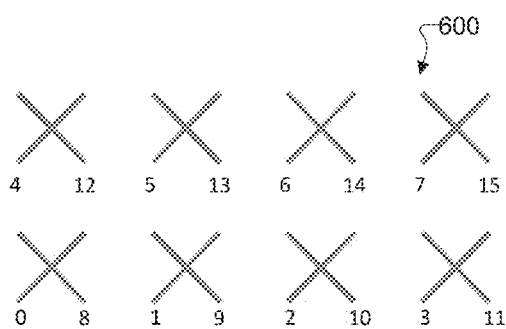
FIG. 6A  16 PORT Config A
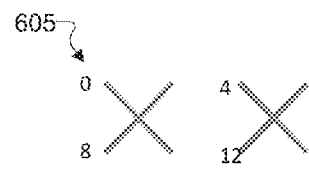
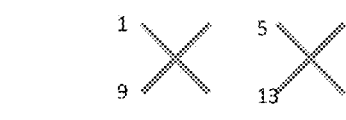
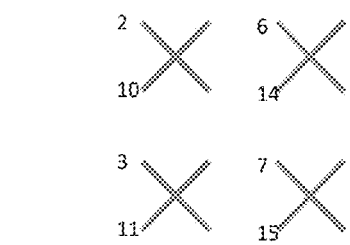
FIG. 6B  16 PORT Config B
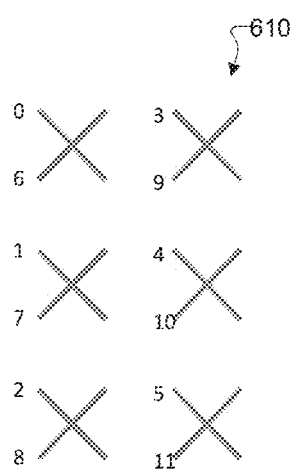
FIG. 6D  12 PORT Config B
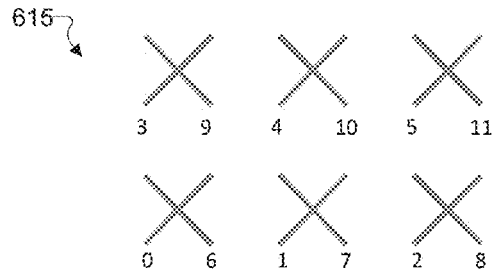
FIG. 6C  12 PORT Config A

ADVANCED FEEDBACK AND REFERENCE SIGNAL TRANSMISSIONS FOR MIMO WIRELESS COMMUNICATION SYSTEMS

CROSS-REFERENCE TO RELATED APPLICATION AND CLAIMS OF PRIORITY

This application claims priority under 35 U.S.C. §119(e) to U.S. Provisional Patent Application No. 62/132,949 filed on Mar. 13, 2015 titled ADVANCED FEEDBACK AND REFERENCE SIGNAL TRANSMISSIONS FOR MIMO WIRELESS COMMUNICATION SYSTEMS, U.S. Provisional Patent Application No. 62/196,565 filed on Jul. 24, 2015 titled ADVANCED FEEDBACK AND REFERENCE SIGNAL TRANSMISSIONS FOR MIMO WIRELESS COMMUNICATION SYSTEMS, U.S. Provisional Patent Application No. 62/201,901 filed on Aug. 6, 2015 titled ADVANCED FEEDBACK AND REFERENCE SIGNAL TRANSMISSIONS FOR MIMO WIRELESS COMMUNICATION SYSTEMS, and U.S. Provisional Patent Application No. 62/286,151 filed on Jan. 22, 2016 titled ADVANCED FEEDBACK AND REFERENCE SIGNAL TRANSMISSIONS FOR MIMO WIRELESS COMMUNICATION SYSTEMS. The above-identified provisional patent applications are hereby incorporated by reference in its entirety.

TECHNICAL FIELD

The present disclosure relates generally to MIMO wireless communication systems and in particular to advanced feedback and reference signal transmissions for MIMO wireless communication systems.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

In a first embodiment, a user equipment (UE) capable of communicating with a base station (BS), the UE comprising a transceiver configured to receive a signal comprising a CSI process configuration, wherein the CSI process configuration comprises a plurality of CSI-RS resource configurations to identify CSI-RS resources, and a controller configured to derive a first PMI index, $i_{11}$ utilizing a first non-precoded CSI-RS on a first non-precoded CSI-RS resource, derive a second PMI index, $i_{12}$ utilizing a second non-precoded CSI-RS on a second non-precoded CSI-RS resource, derive a third PMI index, $i_2$ utilizing a beamformed CSI-RS on a beamformed CSI-RS resource, and cause the transceiver to transmit a CSI feedback comprising the three PMI indices $i_{11}$, $i_{12}$ and $i_2$ to the base station.

In a second embodiment, a base station capable of communicating with a user equipment (UE) is provided. The base station includes a transmitter configured to transmit a signal comprising a CSI process configuration, wherein the CSI process configuration comprises a plurality of CSI-RS resource configurations to identify a plurality of CSI-RS resources comprising a first non-precoded CSI-RS resource carrying a first non-precoded CSI-RS to be used for derivation of a first PMI index $i_{11}$, a second non-precoded CSI-RS resource carrying a second non-precoded CSI-RS to be used for derivation of a second PMI index $i_{12}$, and a beamformed CSI-RS resource carrying a beamformed CSI-RS to be used for derivation of a third PMI index $i_2$, a receiver configured to receive a CSI feedback comprising the three PMI indices $i_{11}$, $i_{12}$ and $i_2$ from the UE, and a controller configured to identify a precoder matrix according to a codebook based on the CSI feedback.

In a third embodiment, A method for communicating with a user equipment (UE) is provided. The method includes transmitting a signal comprising a CSI process configuration, wherein the CSI process configuration configures the UE with a plurality of CSI-RS resource configurations to identify a plurality of CSI-RS resources comprising a first non-precoded CSI-RS resource carrying a first non-precoded CSI-RS to be used for derivation of a first PMI index $i_{11}$, a second non-precoded CSI-RS resource carrying a second non-precoded CSI-RS to be used for derivation of a second PMI index $i_{12}$, and a beamformed CSI-RS resource carrying a beamformed CSI-RS to be used for derivation of a third PMI index $i_2$, receiving a CSI feedback comprising the three PMI indices $i_{11}$, $i_{12}$ and $i_2$ from the UE, and identifying a precoder matrix according to a codebook based on the CSI feedback.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A to 6D illustrate antenna configurations and antenna numbering considered in some embodiments of the present disclosure;

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated by reference into the present disclosure as if fully set forth herein: (1) 3rd generation partnership project (3GPP) TS 36.211, "E-UTRA, Physical channels and modulation", Release-12; (2) 3GPP TS 36.212, "E-UTRA, Multiplexing and channel coding", Release-12; and (3) 3GPP TS 36.213, "E-UTRA, Physical layer procedures", Release-12.

Figure 1:
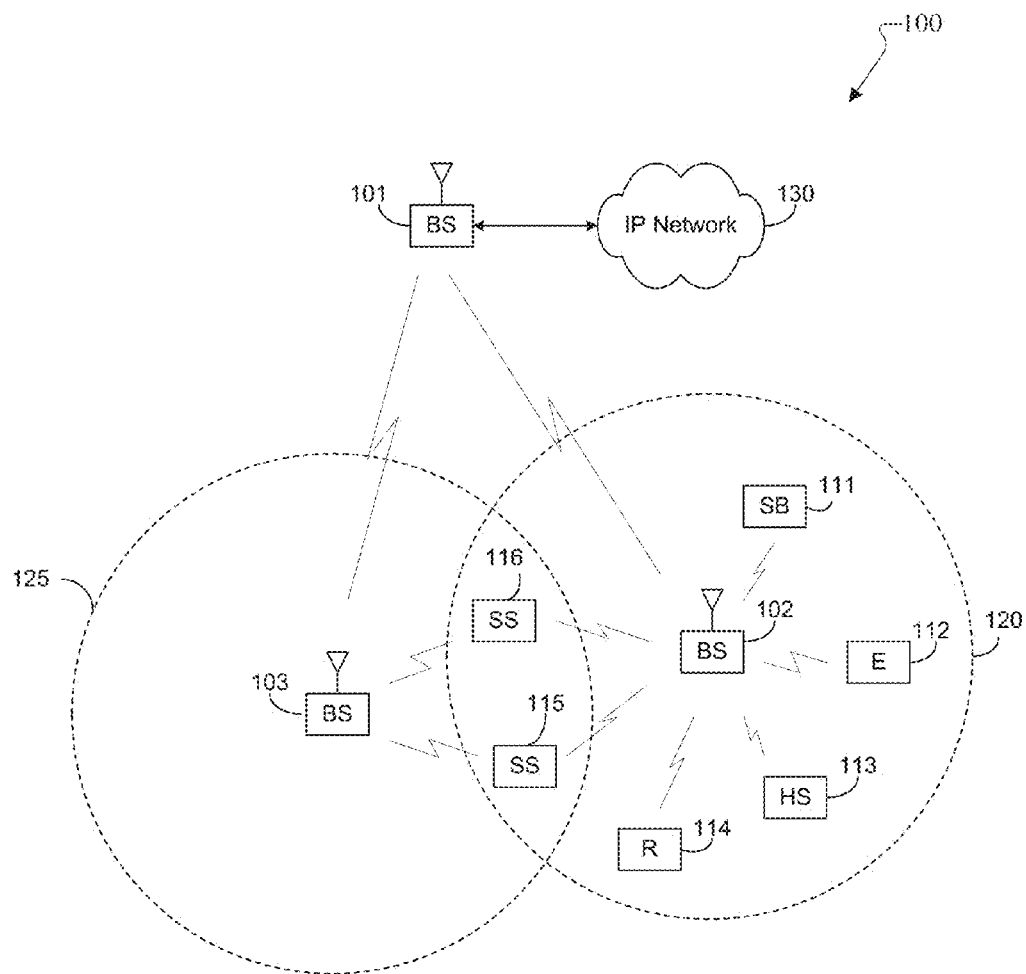
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
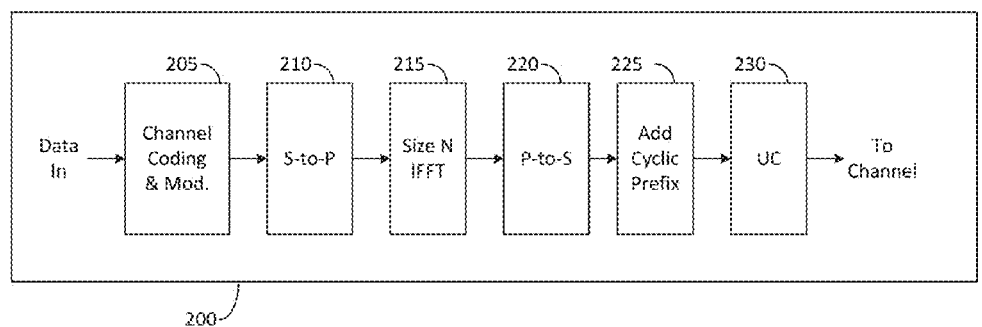
FIGS. 2A and 2B illustrate example wireless transmit and receive paths according to this disclosure.
Figure 2B:
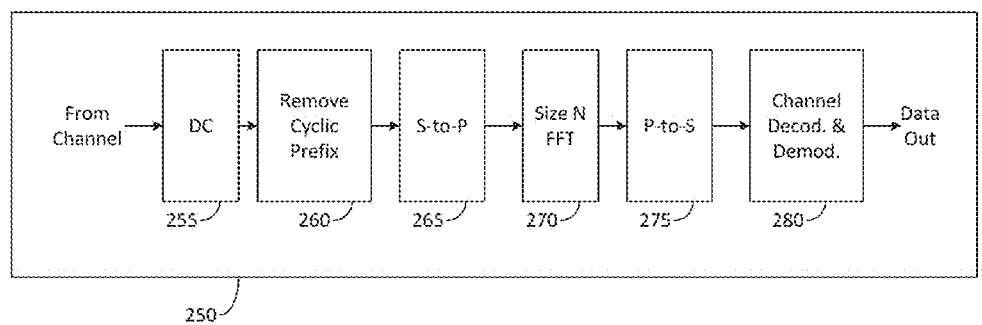

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
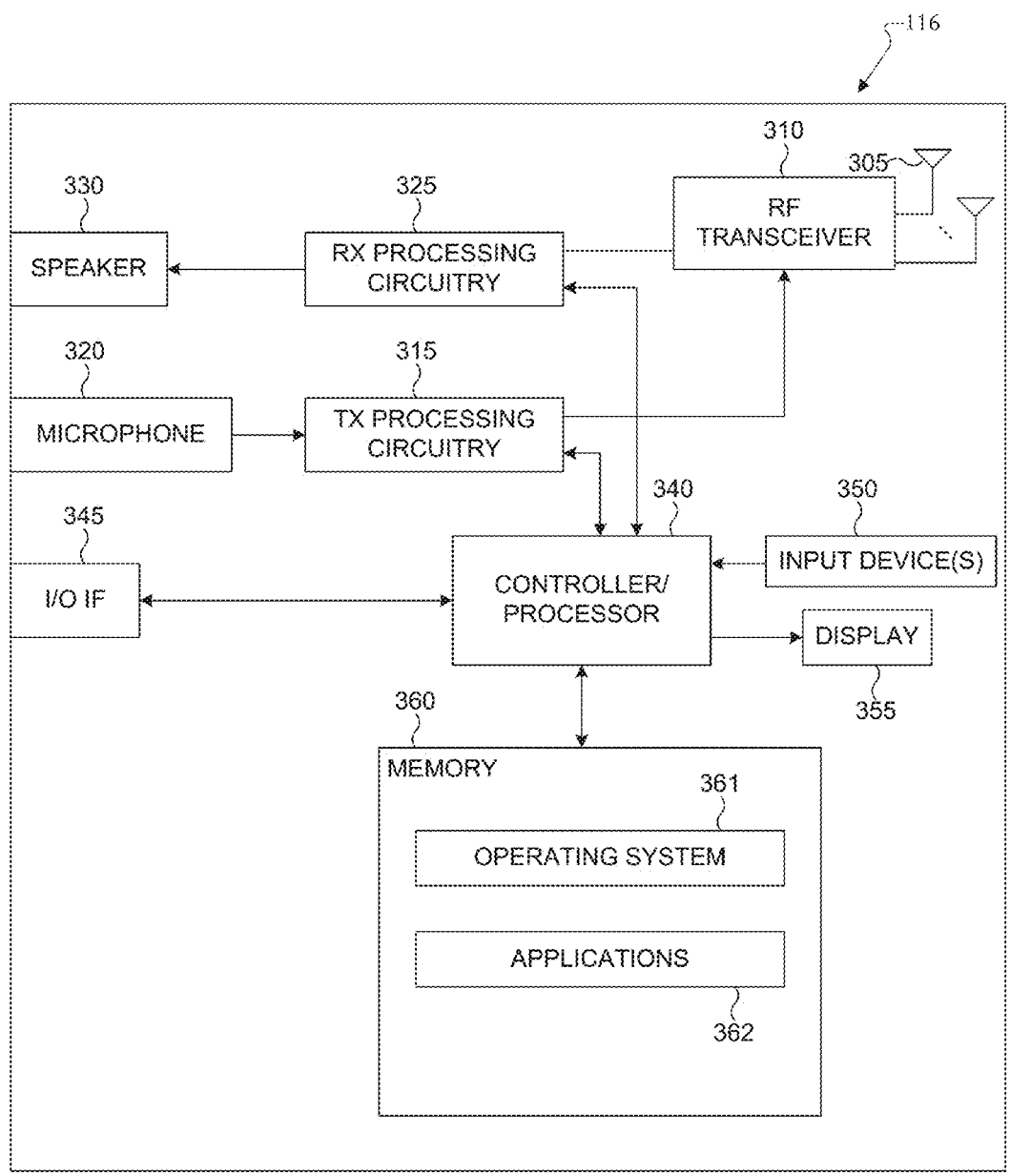
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes set of antennas 305, a radio frequency (RF) transceiver 310, transmit (TX) processing circuitry 315, a microphone 320, and receive (RX) processing circuitry 325. The UE 116 also includes a speaker 330, a processor or controller 340, an input/output (I/O) interface (IF) 345, a touchscreen 350, a display 355, and a memory 360. The memory 360 includes an operating system (OS) program 361 and one or more applications 362.

The RF transceiver 310 receives, from the set of antennas 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor or controller 340 can include one or more processors or other processing devices and execute the basic OS program 361 stored in the memory 360 in order to control the overall operation of the UE 116. For example, the processor or controller 340 could control the reception of forward channel signals and the transmission of reverse channel signals by the RF transceiver 310, the RX processing circuitry 325, and the TX processing circuitry 315 in accordance with well-known principles. In some embodiments, the processor or controller 340 includes at least one microprocessor or microcontroller.

The processor or controller 340 is also capable of executing other processes and programs resident in the memory 360, such as operations for channel quality measurement and reporting for systems having 2D antenna arrays as described in embodiments of the present disclosure as described in embodiments of the present disclosure. The processor or controller 340 can move data into or out of the memory 360 as required by an executing process. In some embodiments, the processor or controller 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The processor or controller 340 is also coupled to the input device(s) 350 and display 355. The operator of the UE 116 can use the device(s) 350 to enter data into the UE 116. The display 355 may be a liquid crystal display or other display capable of rendering text and/or at least limited graphics, such as from web sites. The input device(s) 350 may be a touchscreen and or buttons for receiving user input.

The memory 360 is coupled to the processor or controller 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
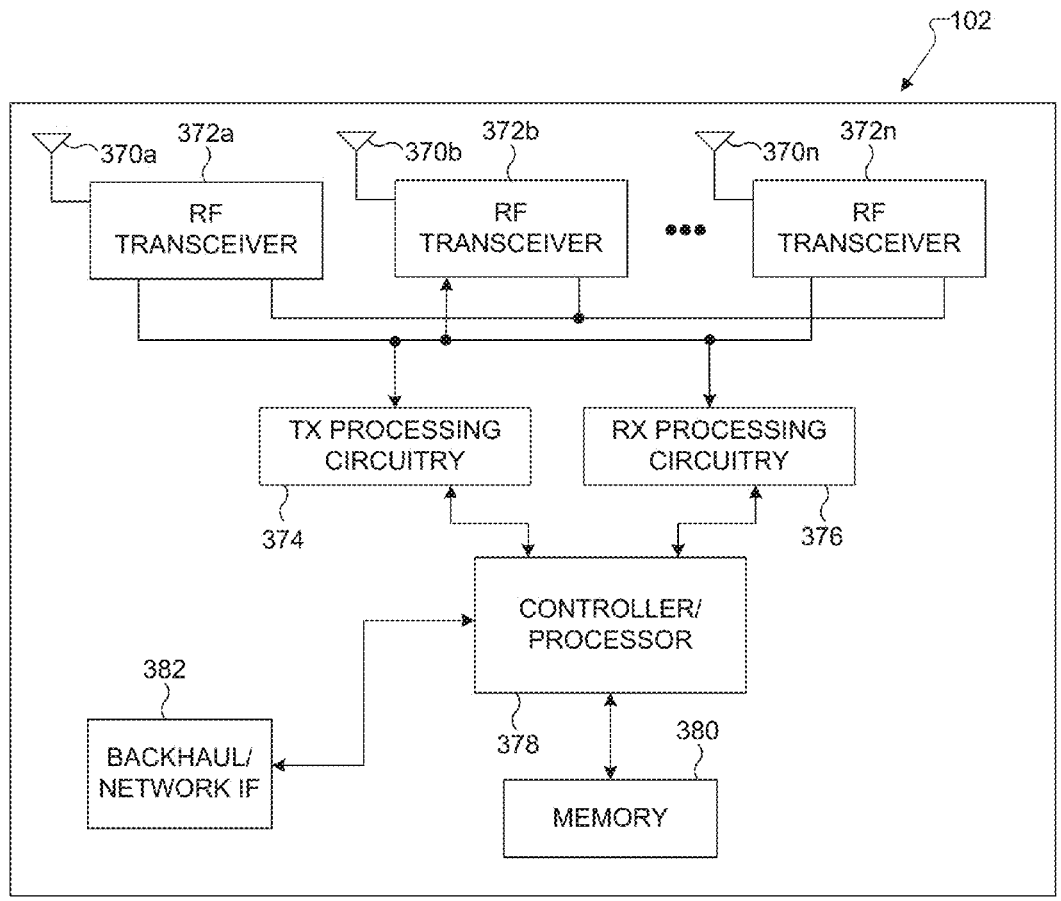
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 324 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 335. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 325. Part of the memory 330 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4A:
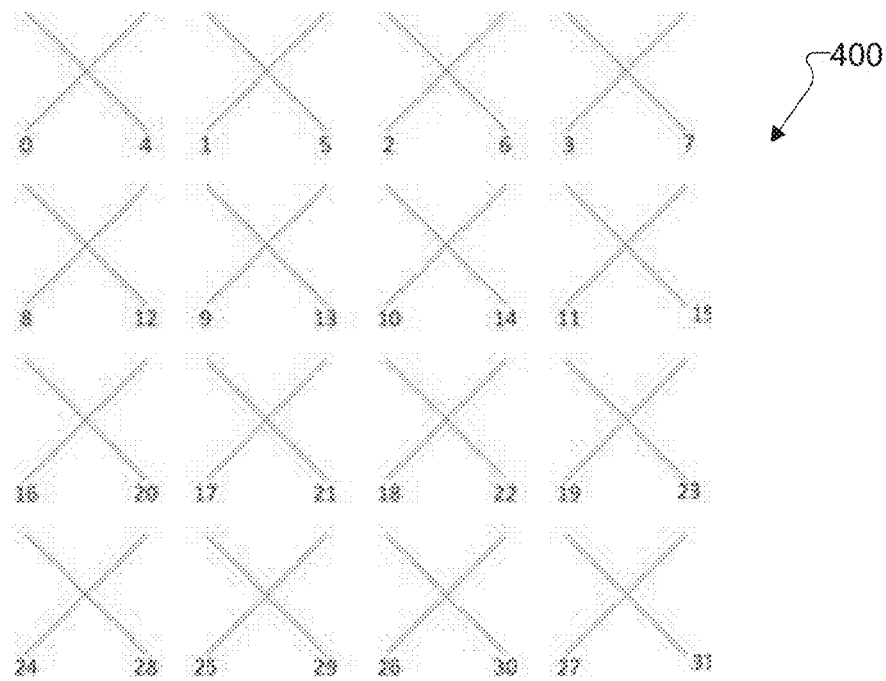
FIGS. 4A and 4B illustrate example 2D antenna arrays comprising 16 dual-polarized antenna elements according to this disclosure.
Figure 4B:
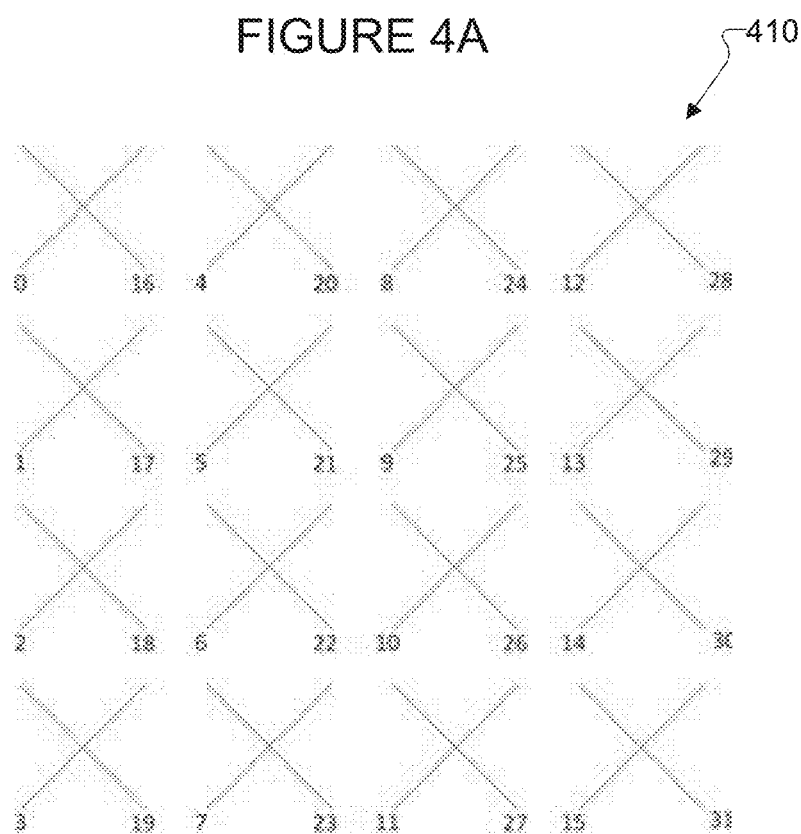

FIGS. 4A and 4B illustrate example 2D antenna arrays that are constructed from 16 dual-polarized antenna elements arranged in a 4×4 rectangular format according to embodiments of the present disclosure. FIG. 4A illustrates a 4×4 dual-polarized antenna array 400 with antenna port (AP) indexing 1, and FIG. 4B is the same 4×4 dual-polarized antenna array 410 with antenna port indexing (AP) indexing 2. The embodiment shown in FIGS. 4A and 4B are for illustration only. Other embodiments could be used without departing from the scope of the present disclosure.

In certain embodiments, each labelled antenna element is logically mapped onto a single antenna port. In general, one antenna port can correspond to multiple antenna elements (physical antennas) combined via a virtualization. This 4×4 dual polarized array can then be viewed as 16×2=32-element array of elements. The vertical dimension (consisting of 4 rows) facilitates elevation beamforming in addition to the azimuthal beamforming across the horizontal dimension (consisting of 4 columns of dual polarized antennas). MIMO precoding in Rel.12 LTE standardization (per TS36.211 sections 6.3.4.2 and 6.3.4.4; and TS36.213 section 7.2.4) was largely designed to offer a precoding gain for one-dimensional antenna array. While fixed beamforming (i.e. antenna virtualization) can be implemented across the elevation dimension, it is unable to reap the potential gain offered by the spatial and frequency selective nature of the channel.

Figure 5:
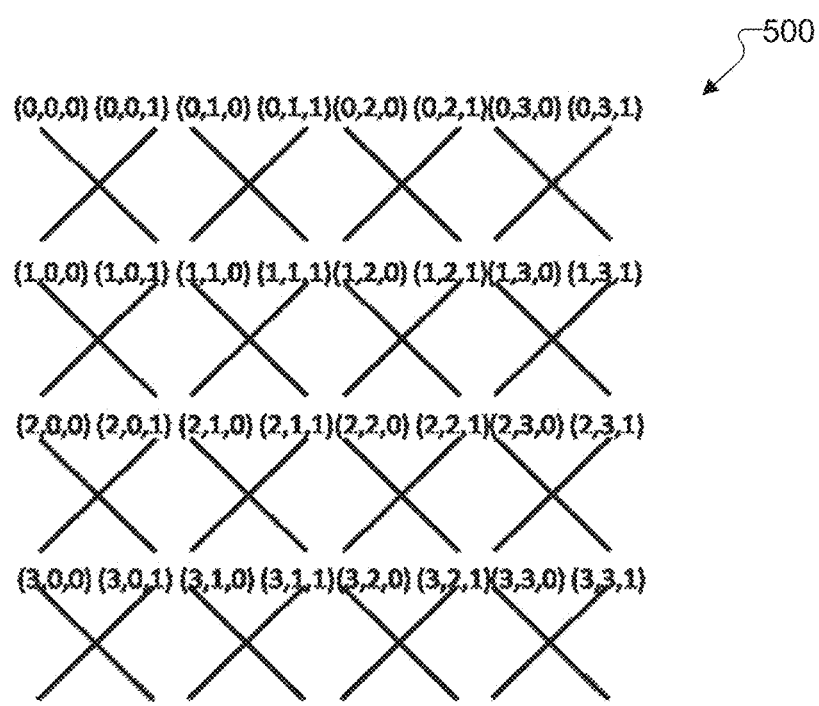
FIG. 5 illustrates another numbering of TX antenna elements according to this disclosure.

FIG. 5 illustrates another numbering of TX antenna elements 500 (or TXRU) according to embodiments of the present disclosure. The embodiment shown in FIG. 5 is for illustration only. Other embodiments could be used without departing from the scope of the present disclosure.

In certain embodiments, eNB is equipped with 2D rectangular antenna array (or TXRUs), comprising M rows and N columns with P=2 polarized, wherein each element (or TXRU) is indexed with (m, n, p), and m=0, . . . , M−1, n=0, . . . , N−1, p=0, . . . , P−1, as illustrated in FIG. 5 with M=N=4. When the example shown in FIG. 5 represents a TXRU array, a TXRU can be associated with multiple antenna elements. In one example (1-dimensional (1D) subarray partition), an antenna array comprising a column with a same polarization of a 2D rectangular array is partitioned into M groups of consecutive elements, and the M groups correspond to the M TXRUs in a column with a same polarization in the TXRU array in FIG. 5. In later embodiments, (M,N) is sometimes denoted as (NH, NV) or (N1, N2).

In some embodiments, a UE is configured with a CSI-RS resource comprising Q=MNP number of CSI-RS ports, wherein the CSI-RS resource is associated with MNP number of resource elements (REs) in a pair of PRBs in a subframe.

In most of the embodiments of the present disclosure, a CSI-RS resource refers to a non-zero-power (NZP) CSI-RS resource unless otherwise stated. In the TS36.331 an NZP CSI-RS resource can be configured utilizing a higher-layer information element (IE) CSI-RS-ConfigNZP: the IE CSI-RS-ConfigNZP is the CSI-RS resource configuration using non-zero power transmission that E-UTRAN may configure on a serving frequency.

CSI-RS-ConfigNZP Information Elements

```
-- ASN1START
CSI-RS-ConfigNZP-r11 ::=       SEQUENCE {
    csi-RS-ConfigNZPId-r11         CSI-RS-ConfigNZPId-r11,
    antennaPortsCount-r11          ENUMERATED {an1, an2, an4, an8},
    resourceConfig-r11             INTEGER (0..31),
```

-continued

```
subframeConfig-r11              INTEGER (0..154),
scramblingIdentity-r11          INTEGER (0..503),
qcl-CRS-Info-r11                SEQUENCE {
    qcl-ScramblingIdentity-r11  INTEGER (0..503),
    crs-PortsCount-r11          ENUMERATED {n1, n2, n4,
                                spare1},
    mbsfn-SubframeConfigList-r11 CHOICE {
        release                 NULL,
        setup                   SEQUENCE {
            subframeConfigList  MBSFN-SubframeConfigList
        }
    }                           OPTIONAL  -- Need
ON
}                               OPTIONAL,  -- Need
OR
...
}
-- ASN1STOP
```

CSI-RS-ConfigNZP field descriptions
antennaPortsCount
Parameter represents the number of antenna ports used for transmission of CSI reference signals where an1 corresponds to 1, an2 to 2 antenna ports etc. see TS 36.211 [21, 6.10.5].
qcl-CRS-Info
Indicates CRS antenna ports that is quasi co-located with the CSI-RS antenna ports, see TS 36.213 [23, 7.2.5]. EUTRAN configures this field if and only if the UE is configured with qcl-Operation set to typeB.
resourceConfig
Parameter: CSI reference signal configuration, see TS 36.211 [21, table 6.10.5.2-1 and 6.10.5.2-2].
subframeConfig
Parameter: $I_{CSI-RS}$, see TS 36.211 [21, table 6.10.5.3-1].
scramblingIdentity
Parameter: Pseudo-random sequence generator parameter, $n_{ID}$, see TS 36.213 [23, 7.2.5].

FIGS. 6A to 6D illustrate antenna configurations and antenna numbering considered in some embodiments of the present disclosure. The embodiment shown in FIGS. 6A to 6D are for illustration only. Other embodiments could be used without departing from the scope of the present disclosure.

In all the four antenna configurations of FIGS. 6A to 6D, cross pol (or X-pol) antenna array is considered, in which a pair of antenna elements in a same physical location are polarized in two distinct angles, e.g., +45 degrees and −45 degrees.

FIGS. 6A and 6B are antenna configurations 600, 605 with 16 CSI-RS ports, comprising 8 pairs of x-pol antenna elements placed in a 2D antenna panel. The 8 pairs can be placed in 2×4 (FIG. 6A) or 4×2 manner (FIG. 6B) on horizontal and vertical dimensions.

FIGS. 6C and 6D are antenna configurations 610, 615 with 12 CSI-RS ports, comprising 6 pairs of x-pol antenna elements placed in a 2D antenna panel. The 8 pairs can be placed in 2×3 (FIG. 6C) or 3×2 manner (FIG. 6D) on horizontal and vertical dimensions.

Antenna Number Assignment in FIG. 6

In FIGS. 6A to 6D, antennas are indexed with integer numbers, 0, 1, . . . , 15 for 16-port configurations (FIGS. 6A and 6B), and 0, . . . , 11 for 12-port configurations (FIGS. 6C and 6D).

In fat (or wide) arrays (such as 12-port configuration A and 16-port configuration A), antenna numbers are assigned such that Consecutive numbers are assigned for all the antenna elements for a first polarization, and proceed to a second polarization. For a given polarization, consecutive numbers are assigned for a first row with progressing one edge to another edge, and proceed to a second row. For example, in FIG. 6A, antenna numbers 0-7 are assigned for a first polarization, and 8-15 are assigned for a second polarization; and antenna numbers 0-3 are assigned for a first row and 4-7 are assigned for a second row.

Antenna numbers in tall arrays (such as 12-port config. B and 16-port config. B) are obtained by simply rotating the fat (or wide) antenna arrays (such as 12-port config. A and 16-port config A) by 90 degrees.

CSI-RS Mapping Pattern and Resource Configuration

In subframes configured for CSI reference signal transmission, the reference signal sequence $r_{l,n_s}(m)$ shall be mapped to complex-valued modulation symbols $a_{k,l}^{(p)}$ used as reference symbols on antenna port p according to:

$$a_{k,l}^{(p)} = w_{l''} \cdot r_{l,n_s}(m')$$

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

The quantity (k',l') and the necessary conditions on $n_s$ are given by the below table and TABLE 6.10.5.2-2 in 3GPP TS36.211 for normal and extended cyclic prefix, respectively. Mapping from CSI reference signal configuration to (k',l') for normal cyclic prefix

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | 9, 2) | 1 | (9, 2) | 1 |

-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

PMI Feedback Precoder Generation

In some embodiments, when a UE is configured with 12 or 16 port CSI-RS for a CSI-RS resource, the UE is configured to report a PMI feedback precoder according to the antenna numbers in FIGS. 6A to 6D. A rank-1 precoder, $W_{m,n,p}$, which is an $N_{CSIRS} \times 1$ vector, to be reported by the UE has the following form:

$$W_{m,n,p} = \begin{bmatrix} w_0 & w_1 & \cdots & w_{N_{CSIRS}-1} \end{bmatrix}^t = \frac{1}{\sqrt{N_{CSIRS}}} \begin{bmatrix} v_m \otimes u_n \\ \varphi_p(v_{m'} \otimes u_{n'}) \end{bmatrix},$$

wherein:
- $N_{CSIRS}$ = number of configured CSI-RS ports in the CSI-RS resource, e.g., 12, 16, the like;
- $u_n$ is a N×1 oversampled DFT vector for a first dimension, whose oversampling factor is $S_N$;
- $v_m$ is a M×1 oversampled DFT vector for a second dimension, whose oversampling factor is $S_M$;
- N≥M, in one alternative, (N,M)∈{(4,2),(4,3)}; in another alternative, (N,M)∈{(4,2),(4,3),(2,2)}; and
- $\phi_p$ is a co-phase, e.g., in a form of $$e^{\frac{2\pi p}{4}},$$

p=0, 1, 2, 3.

Here, example set of oversampling factors that can be configured for $S_N$ and $S_M$ are 4 and 8; and m, m'∈{0, 1, ..., $S_M$M}, and n, n'∈{0, 1, ..., $S_N$N}. In a special case, m=m' and n=n'.

Figure 7:
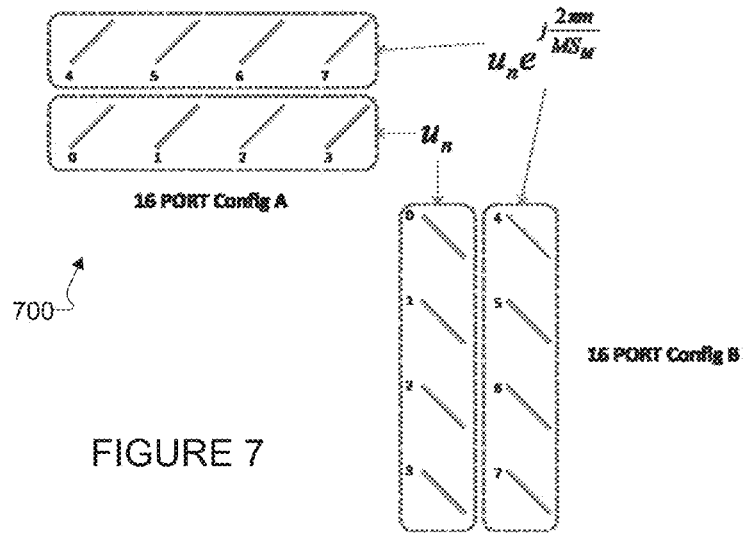
FIG. 7 illustrates a precoding weight application to antenna configurations of FIGS. 6A to 6D according to embodiments of the present disclosure.

FIG. 7 illustrates a precoding weight application 700 to antenna configurations of FIGS. 6A to 6D according to embodiments of the present disclosure. The embodiment shown in FIG. 7 is for illustration only. Other embodiments could be used without departing from the scope of the present disclosure.

When any of 16-port config A and B is used at the eNB with configuring $N_{CSIRS}$=16 to the UE, a submatrix $v_m \otimes u_n$ of $W_{m,n,p}$ corresponds to a precoder applied on 8 co-pol elements, whose antenna numbers are 0 through 7. Given the antenna configuration, M=2 and N=4 should be configured for $v_m$ and $u_n$.

If 16-port config A is used, $u_n$ is a 4×1 vector representing a horizontal DFT beam and $v_m$ is a 2×1 vector representing a vertical DFT beam. If 16-port config B is used, $u_n$ is a 4×1 vector representing a vertical DFT beam and $v_m$ is a 2×1 vector representing a horizontal DFT beam.

With 12 or 16-port configurations, can be written as $$v_m = \begin{bmatrix} 1 & e^{j\frac{2\pi m}{M'}} \end{bmatrix}^t = \begin{bmatrix} 1 & e^{j\frac{2\pi m}{MS_M}} \end{bmatrix}^t.$$

With 16-port configurations, $u_n$ can be written as:

$$u_n = \begin{bmatrix} 1 & e^{j\frac{2\pi n}{N'}} & e^{j\frac{4\pi n}{N'}} & e^{j\frac{6\pi n}{N'}} \end{bmatrix}^t = \begin{bmatrix} 1 & e^{j\frac{2\pi n}{NS_N}} & e^{j\frac{4\pi n}{NS_N}} & e^{j\frac{6\pi n}{NS_N}} \end{bmatrix}^t.$$

With 12-port configurations, $u_n$ can be written as:

$$u_n = \begin{bmatrix} 1 & e^{j\frac{2\pi n}{N'}} & e^{j\frac{4\pi n}{N'}} \end{bmatrix}^t = \begin{bmatrix} 1 & e^{j\frac{2\pi n}{NS_N}} & e^{j\frac{4\pi n}{NS_N}} \end{bmatrix}^t.$$

Precoding weights to be applied to antenna port numbers 0 through 3 are $u_n$, and the precoding weights to be applied to antenna ports 4 through 7 are $$u_n e^{j\frac{2\pi m}{MS_M}}$$

with an appropriate power normalization factor. Similarly, precoding weights to be applied to antenna port numbers 8 through 11 are $u_{n'}$, and the precoding weights to be applied to antenna ports 12 through 15 are $$u_{n'} e^{j\frac{2\pi m'}{MS_M}}$$

with an appropriate power normalization factor. This method of precoding weight application is illustrated in FIG. 7.

Rel. 8 LTE 2-Tx PMI Codebook

For transmission on two antenna ports, $p \in \{0,1\}$, and for the purpose of CSI reporting based on two antenna ports $p \in \{0,1\}$ or $p \in \{15,16\}$ the precoding matrix W(i) shall be selected from TABLE 1 or a subset thereof. For the closed-loop spatial multiplexing transmission mode, the codebook index 0 is not used when the number of layers is v=2.

TABLE 1

Codebook for transmission on antenna ports {0,1} and for CSI reporting based on antenna ports {0,1} or {15,16}.

| Codebook index | Number of layers υ | |
| --- | --- | --- |
|  | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

Hybrid CSI-RS for Long-term and Short-term CSI Estimation

In most of the embodiments of the present disclosure, a CSI-RS resource refers to a non-zero-power (NZP) CSI-RS resource unless otherwise stated.

Figure 8:
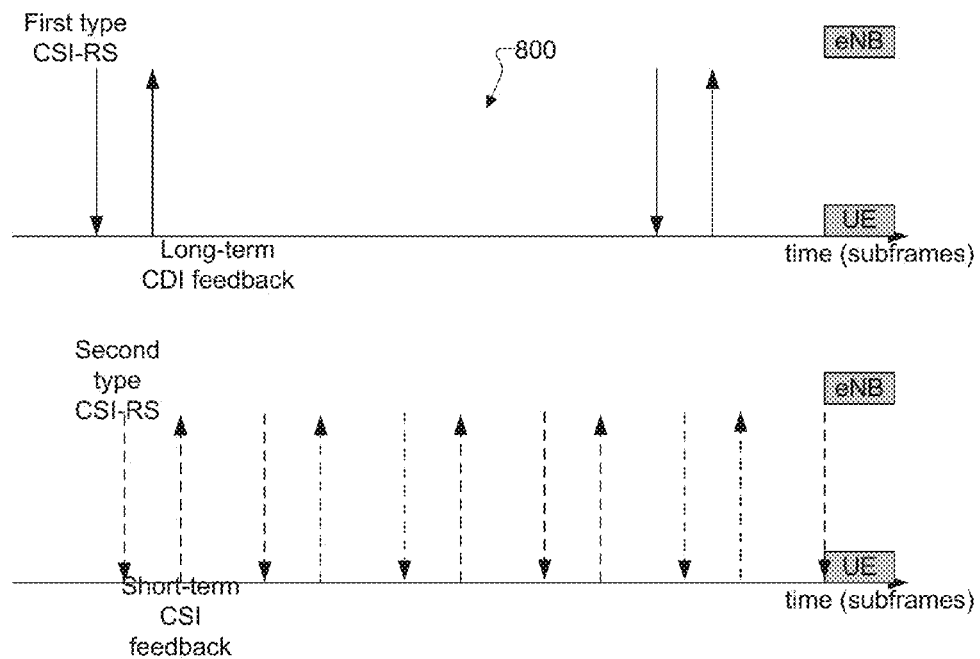
FIG. 8 illustrates an eNB's transmission of two types of CSI-RS and corresponding a UE's feedback according to some embodiments of the present disclosure.

FIG. 8 illustrates eNB's transmission 800 of two types of CSI-RS and corresponding UE's feedback according to some embodiments of the present disclosure. The embodiment shown in FIG. 8 is for illustration only. Other embodiments could be used without departing from the scope of the present disclosure.

In these embodiments, eNB configures two CSI-RS resources for a UE: (1) a first CSI-RS resource for long-term channel direction estimation; and (2) a second CSI-RS resource for short-term CSI estimation (e.g., co-phase, beam selection PMI, RI and CQI).

TABLE 2 illustrates a PMI codebook construction according to some embodiments of the present disclosure.

TABLE 2

Codebook for 1-layer CSI reporting using antenna ports 15 to 22

| $i_1$ | $i_2$ | | | | | | | |
| --- | --- | --- | --- | --- | --- | --- | --- | --- |
|  | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
| --- | --- | --- | --- | --- | --- | --- | --- | --- |
|  | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}}\begin{bmatrix}v_m\\\varphi_n v_m\end{bmatrix}$ TABLE 3 illustrates a PMI codebook construction according to some embodiments of the present disclosure, wherein it is assumed that the antenna port indexing is done according to FIG. 5; and $$W^{(1)}_{m_1,m_2,n} = \frac{1}{\sqrt{Q}} \begin{bmatrix} u_{m_1} \otimes v_{m_2} \\ \varphi_n u_{m_1} \otimes v_{m_2} \end{bmatrix},$$

$\varphi_n = e^{j\frac{2\pi n}{4}}$  $Q$ = number of $CSI\text{-}RS$ antenna ports, $s_1$ and $s_2$ are positive integers representing an oversampling factor.

TABLE 3

| Master codebook for 1 layer CSI reporting for $L_1 = L_2 = 4$ | | | | |
| --- | --- | --- | --- | --- |
| | | $i_2$ | | |
| | 0 | 1 | 2 | 3 |
| Precoder | $W^{(1)}_{s_1 i_{1,1}, s_2 i_{1,2}, 0}$ | $W^{(1)}_{s_1 i_{1,1}, s_2 i_{1,2}, 1}$ | $W^{(1)}_{s_1 i_{1,1}, s_2 i_{1,2}, 2}$ | $W^{(1)}_{s_1 i_{1,1}, s_2 i_{1,2}, 3}$ |
| | | $i_2$ | | |
| | 4 | 5 | 6 | 7 |
| Precoder | $W^{(1)}_{s_1 i_{1,1}+p_1, s_2 i_{1,2}, 0}$ | $W^{(1)}_{s_1 i_{1,1}+p_1, s_2 i_{1,2}, 1}$ | $W^{(1)}_{s_1 i_{1,1}+p_1, s_2 i_{1,2}, 2}$ | $W^{(1)}_{s_1 i_{1,1}+p_1, s_2 i_{1,2}, 3}$ |
| | | $i_2$ | | |
| | 8 | 9 | 10 | 11 |
| Precoder | $W^{(1)}_{s_1 i_{1,1}+2p_1, s_2 i_{1,2}, 0}$ | $W^{(1)}_{s_1 i_{1,1}+2p_1, s_2 i_{1,2}, 1}$ | $W^{(1)}_{s_1 i_{1,1}+2p_1, s_2 i_{1,2}, 2}$ | $W^{(1)}_{s_1 i_{1,1}+2p_1, s_2 i_{1,2}, 3}$ |
| | | $i_2$ | | |
| | 12 | 13 | 14 | 15 |
| Precoder | $W^{(1)}_{s_1 i_{1,1}+3p_1, s_2 i_{1,2}, 0}$ | $W^{(1)}_{s_1 i_{1,1}+3p_1, s_2 i_{1,2}, 1}$ | $W^{(1)}_{s_1 i_{1,1}+3p_1, s_2 i_{1,2}, 2}$ | $W^{(1)}_{s_1 i_{1,1}+3p_1, s_2 i_{1,2}, 3}$ |
| | | $i_2$ 16-31 | | |
| Precoder | Entries 16-31 constructed with replacing the second subscript $s_2 i_{1,2}$ with $s_2 i_{1,2} + p_2$ in entries 0-15. | | | |
| | | $i_2$ 32-47 | | |
| Precoder | Entries 32-47 constructed with replacing the second subscript $s_2 i_{1,2}$ with $s_2 i_{1,2} + 2p_2$ in entries 0-15. | | | |
| | | $i_2$ 48-63 | | |
| Precoder | Entries 48-63 constructed with replacing the second subscript $s_2 i_{1,2}$ with $s_2 i_{1,2} + 3p_2$ in entries 0-15. | | | |

In one example, with $$Q = 16, u_{m_1} = \begin{bmatrix} 1 & e^{j\frac{2\pi m_2}{32}} \end{bmatrix}^t \text{ and } v_{m_2} = \begin{bmatrix} 1 & e^{j\frac{2\pi m_1}{32}} & e^{j\frac{4\pi m_1}{32}} & e^{j\frac{6\pi m_1}{32}} \end{bmatrix}^t.$$

In some embodiments, the long-term channel direction comprises information of a beam group (or a beam set) that best represents channel directions for the link between eNB and the UE. In some embodiments, the indicator for the beam group is called the first PMI (corresponding to a selected set of precoding matrices). The first PMI ($i_1$) may comprise two indices ($i_{1,1}$, $i_{1,2}$) for the two dimensions, e.g., for azimuth and elevation.

In some embodiments, the indicator for the short-term CSI (comprising information of co-phase and beam selection) is called the second PMI.

In some embodiments, the second PMI (i2) may comprise two indices (i2,1, i2,2) for the two dimensions, e.g., for azimuth and elevation.

In some embodiments, co-phase information is contained within only one of i2,1, i2,2.

In some embodiments, the second CSI-RS comprises only a pair of antenna ports, in which case the second PMI (i2) includes only co-phase information (no beam selection).

In another method, these two CSI-RS resources are configured in a single CSI process.

eNB may configure the duty cycle of CSI-RS transmission of the first CSI-RS resource longer than the second CSI-RS. Once eNB obtains long-term CDI from the UE, the eNB UE-specifically pre-codes (or beam-forms) the second CSI-RS based upon the long-term CDI, according to some embodiments of the present disclosure.

Utilizing channel estimates estimated with the first CSI-RS, the UE estimates and feeds back long-term CDI.

Utilizing channel estimates estimated with the second CSI-RS, the UE estimates and feeds back co-phase information (and beam selection information in some embodiments). In one alternative, the UE derives and feeds back rank information with the second CSI-RS; in another alternative the UE derives and feeds back rank information with the first CSI-RS.

In some embodiments, the UE drives short-term CSI out of 2Q antenna ports comprising the second CSI-RS, that can be decomposed into Q pairs of antenna ports. A same beamforming vector is applied for each pair of antenna ports, but the two antenna ports are respectively associated with two different polarizations.

In one example, Q=1, in which case the UE is configured with 2 antenna ports for short-term CSI feedback. The short-term CSI feedback in this case may comprise Rel-8 LTE 2-Tx CQI/PMI/RI and the PMI and RI feedback contents are constructed according to TABLE 1. It is noted that RI corresponds to number of layers in TABLE 1.

In one method for the first CSI-RS resource, NP CSI-RS ports (in one example, NP=P·M·N; in another example NP=M·N according to the notation in the embodiments associated with FIG. 2) are configured for the first CSI-RS resource, and the NP CSI-RS ports are one-to-one mapped to the NP TXRUs in the antenna array. In this case, the UE estimates channel direction information (CDI) from utilizing the channel estimates of the NP CSI-RS ports, and feeds back the CDI to the eNB. The CDI can be reported on either PUCCH or on PUSCH.

In one example, NP=M·N, and the UE is configured with a first and a second numbers of antenna ports, M and N, according to the notation in the embodiments associated with FIG. 5.

In another example, NP=P·M·N, and the UE is configured with a first, a second and a third numbers of antenna ports, M and N and P, according to the notation in the embodiments associated with FIG. 5.

In another example, NP=P·M·N, and the UE is configured with a first and a second numbers of antenna ports, P·M and N, according to the notation in the embodiments associated with FIG. 5.

In one example of the current method, the CDI is two DFT precoders: one for representing azimuth channel direction, and the other for representing elevation channel direction. Furthermore, in case M=4, the DFT vector for the azimuth channel direction has four elements (here the number of elements in the DFT vector is equal to M):

$$v_a^{(A)} = [1\, e^{j2\pi a/A} e^{j4\pi a/A} e^{j6\pi a/A}]^T,\ a=0,1,\ldots A-1;\ \text{and}$$

In case N=4, the DFT vector for the elevation channel direction is (here the number of elements in the DFT vector is equal to N):

$$u_b^{(B)} = [1\, e^{j2\pi b/B} e^{j4\pi b/B} e^{j6\pi b/B}]^T,\ b=0,1,\ldots B-1,$$

wherein example values for A is 32, 16 and 8; and example values for B are 16, 8, 4. The feedback information of the UE may comprise A·B states; if A=16 and B=8, then the number of states is 128, and it is a 7-bit information. The azimuth CDI and elevation CDI can be either jointly or separately coded as in the following two tables. The information field(s) are encoded and then mapped onto a PUSCH for aperiodic CSI feedback or a PUCCH resource for periodic CSI feedback.

TABLE 4

Example CDI feedback

| CDI contents | Details | Information field |
|---|---|---|
| Azimuth CDI | $v_a^{(A)} = [1\, e^{j2\pi a/A} e^{j4\pi a/A} e^{j6\pi a/A}]^T$, $a = 0, 1, \ldots A - 1, A = 16$ | A 4-bit information field |
| Elevation CDI | $u_b^{(B)} = [1\, e^{j2\pi b/B} e^{j4\pi b/B} e^{j6\pi b/B}]^T$, $b = 0, 1, \ldots B - 1, B = 8$ | A 3-bit information field |

TABLE 5

Another example CDI feedback

| CDI contents | Details | Information field |
|---|---|---|
| Azimuth & Elevation CDI | $v_a^{(A)} = [1\, e^{j2\pi a/A} e^{j4\pi a/A} e^{j6\pi a/A}]^T$, $a = 0, 1, \ldots A - 1, A = 16$ $u_b^{(B)} = [1\, e^{j2\pi b/B} e^{j4\pi b/B} e^{j6\pi b/B}]^T$, $b = 0, 1, \ldots B - 1, B = 8$ | A 7-bit information field |

In another example with M=2 and N=4, the DFT vector for the azimuth channel direction has four elements (here the number of elements in the DFT vector is equal to M):

$$v_a^{(A)} = [1\, e^{j2\pi a/A} e^{j4\pi a/A} e^{j6\pi a/A}]^T,\ a=0,1,\ldots A-1;\ \text{and}$$

the DFT vector for the elevation channel direction is (here the number of elements in the DFT vector is equal to M):

$$u_b^{(B)} = [1\, e^{j2\pi b/B}]^T,\ b=0,1\ldots B-1.$$

One possible way to feedback the CDI in this case is illustrated in the following table.

TABLE 6

CDI feedback

| CDI contents | Details | Information field |
|---|---|---|
| Azimuth CDI | $v_a^{(A)} = [1\, e^{j2\pi a/A} e^{j4\pi a/A} e^{j6\pi a/A}]^T$, $a = 0, 1, \ldots A - 1, A = 16$ | A 4-bit information field |
| Elevation CDI | $u_b^{(B)} = [1\, e^{j2\pi b/B}]^T$, $b = 0, 1, \ldots B - 1, B = 4$ | A 2-bit information field |

In another example of the current embodiment, the CDI corresponds to a set of L vectors in a form of $v_a \otimes u_b$, or alternatively $u_b \otimes v_a$, and information field for the CDI will contain information on the L index pairs: $\{(a_l, b_l)\}_{l=0}^{L-1}$.

U.S. provisional patent application Ser. No. 62/073,782 filed on Oct. 31, 2014, which are hereby incorporated into the present disclosure as if fully set forth herein, has shown a couple of methods to encode this type of CDI information. One example method to quantize azimuth CDI is described in the following table, wherein A=32 is assumed:

TABLE 7

| Vector set indicator index (5 bits) | Vector combination index (i) | Selected vector set (CDI) |
|---|---|---|
| 0, . . . , 15 | 0, . . . 15 | $\{v_{2i}, v_{2i+1}, v_{2i+2}, v_{2i+3}\}$ |
| 16, . . . , 23 | 0, . . . , 7 | $\{v_{4i}, v_{4i+2}, v_{4i+4}, v_{4i+6}\}$ |
| 24, . . . , 27 | 0, . . . , 3 | $\{v_{8i}, v_{8i+4}, v_{8i+8}, v_{8i+12}\}$ |
| 28 (Option 1) | 0 | $\{v_0, v_8, v_{16}, v_{24}\}$ |
| 29, 30, 31 (Option 1) | reserved | |
| 28, 29, 30, 31 (Option 2) | 0, . . . , 3 | $\{v_{2i+0}, v_{2i+8}, v_{2i+16}, v_{2i+24}\}$ |

Another example method to quantize azimuth CDI is described in the following table, wherein A=32 is assumed:

TABLE 8

| Vector set indicator index (4 bits) | Vector combination index (i) | Selected vector set (CDI) |
|---|---|---|
| 0, . . . , 15 | 0, . . . 15 | $\{v_{2i}, v_{2i+1}, v_{2i+2}, v_{2i+3}\}$ |

It is noted that the elevation CDI can also be similarly quantized as the azimuth CDI.

Embodiment: CSI-RS for Long-Term CSI Estimation

An eNB has a 2D TXRU array with (M, N, P)=(4, 4, 2), according to the notation associated with the embodiments related to FIG. 2. In this case the total number of TXRUs is 32. In this embodiment, the eNB configures a UE with NP CSI-RS ports wherein NP=M·N=16 for the first type of CSI-RS, so that the UE can estimate long-term CDI.

In one method, these 16 CSI-RS antenna ports are one-to-one mapped to 16 TXRUs associated with a same antenna polarization. For example, 16 CSI-RS antenna ports are one-to-one mapped to TXRUs (0, 0, 0), (0, 1, 0), (0, 2, 0), (0, 3, 0), (1, 0, 0), (1, 1, 0), (1, 2, 0), (1, 3, 0), (2, 0, 0), (2, 1, 0), (2, 2, 0), (2, 3, 0), (3, 0, 0), (3, 1, 0), (3, 2, 0), (3, 3, 0).

Figure 9:
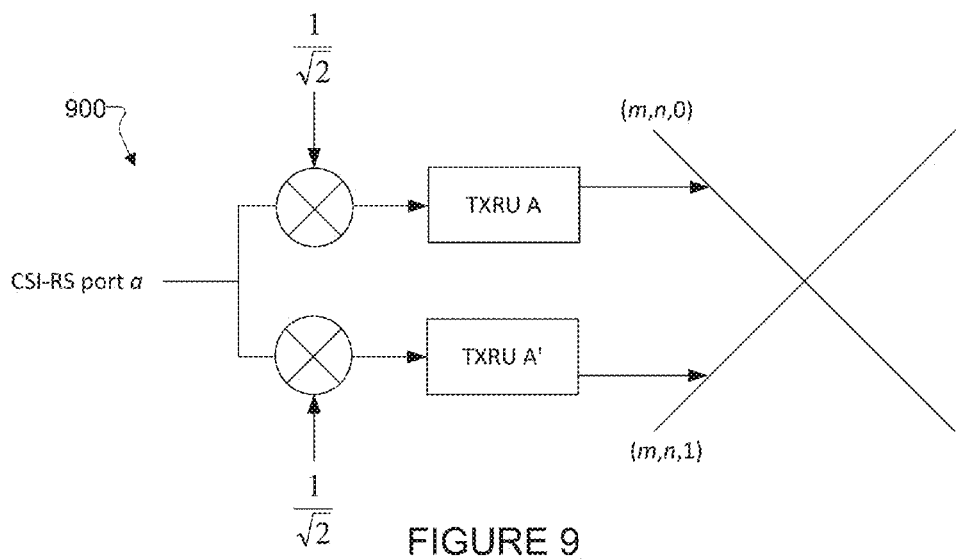
FIG. 9 illustrates an example CSI-RS port virtualization with 16 ports to feed 32 TXRUs according to one embodiment of the present disclosure.

FIG. 9 illustrates an example CSI-RS port virtualization 900: 16 ports to feed 32 TXRUs according to embodiments of the present disclosure. The embodiment shown in FIG. 9 is for illustration only. Other embodiments could be used without departing from the scope of the present disclosure.

In another method, these 16 CSI-RS antenna ports are mapped to 32 TXRUs, wherein each CSI-RS port is associated with a pair of TXRUs (m,n,0) and (m,n,1). In one example, association weight vector of each CSI-RS port to the pair of TXRUs (labeled as TXRU A and TXRU A') can be [+1+1]/sqrt(2), as illustrated in FIG. 9. In the figure, CSI-RS port a is split into two branches and respectively scaled with 1/sqrt(2), and then fed onto TXRUs A and A' which are associated with antenna subarray (m,n,0) and (m,n,1). It is noted that the particular precoding weights are just for illustration.

The eNB with (M, N, P)=(4, 4, 2) may additionally configures and transmits the second type of CSI-RS. The second type of CSI-RS is precoded with a precoder selected based upon the CDI feedback of the UE, according to some embodiments of the present disclosure, in which the UE drives short-term CSI out of Q (=q/2) antenna ports that can be decomposed into q pairs of antenna ports, and each pair comprises two antenna ports with the same beamforming vector but with different polarization.

In another method for the first CSI-RS resource, NB CSI-RS ports are configured for the first CSI-RS resource, and the NB CSI-RS ports are beamformed, i.e., precoding weights are applied to each CSI-RS to be mapped onto the NP TXRUs in the antenna array. In this case, the CDI which the UE estimates can be a selected set of CSI-RS ports out of the NB CSI-RS ports.

The UE may select L CSI-RS ports which have the L strongest received power among NB CSI-RS ports. Some example values of L is L=1 and L=4.

After selecting L such CSI-RS ports, the UE reports information on the selected L CSI-RS ports to the eNB on PUSCH or on PUCCH.

Periodic CSI Reporting Modes in LTE

A UE is semi-statically configured by higher layers to periodically feedback different CSI components (CQI, PMI, PTI, and/or RI) on the PUCCH using the reporting modes given in TABLE 9. A UE in a certain transmission mode can be configured by higher layers for multiple periodic CSI reports corresponding to one or more CSI processes per serving cell on PUCCH.

TABLE 9

CQI and PMI Feedback Types for PUCCH CSI reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

Aperiodic CSI Reporting Modes in LTE

A UE is semi-statically configured by higher layers to feed back CQI and PMI and corresponding RI on the same PUSCH using one of the following CSI reporting modes given in the following table.

TABLE 10

CQI and PMI Feedback Types for PUSCH CSI reporting Modes

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

Two CSI processes for the Long-term and Short-term CSI Reports

In some embodiments, eNB configures two CSI processes—first and second CSI processes—for receiving the reports on long-term and short-term CSI.

The first CSI process is configured for long-term CSI, and it comprises a first CSI-RS resource configuration, and at least one of periodic CSI feedback configuration and aperiodic CSI feedback configuration.

The second CSI process is configured for short-term CSI, and it comprises a second CSI-RS resource configuration and a CSI-IM, and at least one of periodic CSI feedback configuration and aperiodic CSI feedback configuration.

When a UE is configured for the first CSI process comprising the first CSI-RS resource configuration and the periodic CSI feedback configuration, the UE will report long-term CSI on the configured PUCCH resource in the PMI reporting instances, as configured in the periodic CSI feedback configuration.

In some embodiments, A UE is semi-statically configured by higher layers to periodically feed back different CSI components (CQI, PMI, PTI, and/or RI) on the PUCCH using the reporting modes given in TABLE 11, wherein a new row is added to cope with reports with only CDI (or PMI), with no-CQI.

TABLE 11

CQI and PMI Feedback Types for PUCCH CSI reporting Modes

| | | PMI Feedback Type | |
|---|---|---|---|
| | | No PMI | Single PMI |
| PUCCH CQI Feedback Type | No CQI | | Mode 0-1 |
| | Wideband (wideband CQI) | Mode 1-0 | Mode 1-1 |
| | UE Selected (subband CQI) | Mode 2-0 | Mode 2-1 |

In some embodiments, A UE is semi-statically configured by higher layers to periodically feed back different CSI components (CQI, PMI, and/or RI) on the PUSCH using the reporting modes given in TABLE 12, wherein a new row is added to cope with reports with only CDI (or PMI), with no-CQI.

TABLE 13 below, wherein the CDI reporting instances are configured by the periodic CSI reporting configuration.

TABLE 13

|  | The 1$^{st}$ reporting instance | The 2$^{nd}$ reporting instance | The 3$^{rd}$ reporting instance | The 4$^{th}$ reporting instance | The 5$^{th}$ reporting instance | The 6$^{th}$ reporting instance |
| --- | --- | --- | --- | --- | --- | --- |
| CSI reporting contents with Alt 1 | The 1$^{st}$ CDI The 2$^{nd}$ CDI | The 1$^{st}$ CDI The 2$^{nd}$ CDI | The 1$^{st}$ CDI The 2$^{nd}$ CDI | The 1$^{st}$ CDI The 2$^{nd}$ CDI | The 1$^{st}$ CDI The 2$^{nd}$ CDI | The 1$^{st}$ CDI The 2$^{nd}$ CDI |
| CSI reporting contents with Alt 2 | The 1$^{st}$ CDI | The 2$^{nd}$ CDI | The 1$^{st}$ CDI | The 2$^{nd}$ CDI | The 1$^{st}$ CDI | The 2$^{nd}$ CDI |
| CSI reporting contents with Alt 3 | The 1$^{st}$ CDI | The 2$^{nd}$ CDI | The 2$^{nd}$ CDI | The 2$^{nd}$ CDI | The 1$^{st}$ CDI | The 2$^{nd}$ CDI |

TABLE 12

CQI and PMI Feedback Types for PUSCH CSI reporting Modes

|  |  | PMI Feedback Type | | |
| --- | --- | --- | --- | --- |
|  |  | No PMI | Single PMI | Multiple PMI |
| PUSCH CQI Feedback Type | No CQI |  | Mode 0-1 |  |
|  | Wideband (wideband CQI) |  |  | Mode 1-2 |
|  | UE Selected (subband CQI) | Mode 2-0 |  | Mode 2-2 |
|  | Higher Layer-configured (subband CQI) | Mode 3-0 | Mode 3-1 | Mode 3-2 |

In some embodiments, the long-term CSI comprises only a single indicator, namely CDI indicator. In this case, the UE is configured with PUCCH mode 0-1 according to TABLE 11 and PUSCH mode 0-1 according to TABLE 12. For PUCCH feedback, the CDI indicator is reported in every PMI reporting instances as configured by the periodic CSI feedback configuration.

It is noted that CDI is by nature for facilitating eNB's precoder selection; and it can be alternatively referred to PMI.

In some embodiments, the long-term CSI comprises two CDI indicators, namely a first and a second CDI indictors (respectively corresponding to azimuth and elevation CDI). In this case, the UE is configured with PUCCH mode 0-1 according to TABLE 11 and PUSCH mode 0-1 according to TABLE 12. In a first alternative, the two CDI indicators are reported in every CDI reporting instances as configured by the periodic CSI feedback configuration. In another alternative, the two CDI indicators are separately reported in different PMI reporting instances.

In some embodiments, the first CDI indicator is reported in the first, the third, the fifth reporting instances, and so on; and the second CDI indicator is reported in the second, the fourth, and the sixth reporting instances, and so on. In another method, the periodic CSI feedback configuration configures the UE to report one report less frequently than the other; for example, the period to report the first CDI indicator is four times more than that of the second CDI indicator. These embodiments are illustrated in the table In some embodiments, the long-term CSI comprises two CDI indicators and a wideband CQI. In this case, the UE is configured with PUCCH mode 0-1 according to TABLE 11 and PUSCH mode 1-1 according to TABLE 12. In CQI/CDI reporting instances as configured by the periodic CSI feedback, the two CDI and corresponding CQI are reported on the configured PUCCH. The wideband CQI is derived with an assumption that a wideband precoder corresponding to the CDI indicators is applied across the system bandwidth. The reported wideband CQI may be used by eNB to decide when to transmit the second CSI-RS for a UE, in case eNB has configured the UE to receive aperiodic CSI-RS.

UL Data and Control Multiplexing

Figure 10:
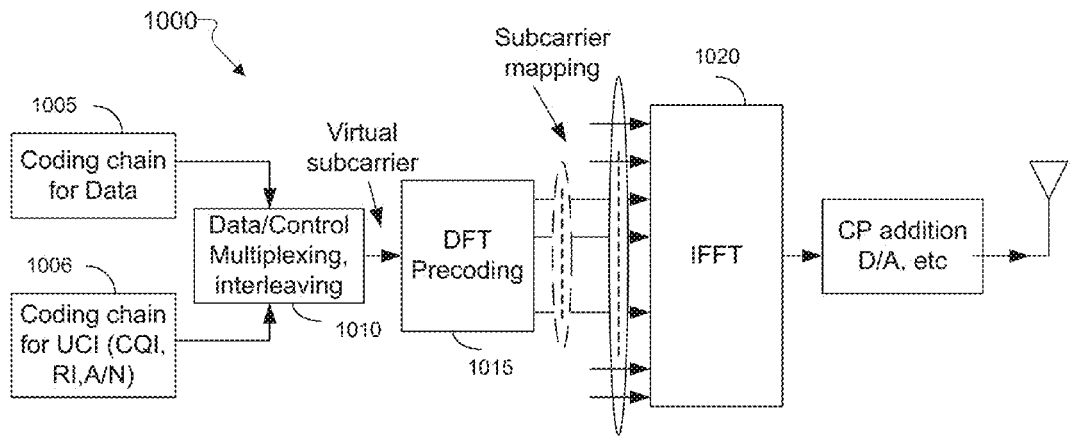
FIG. 10 illustrates the single-carrier frequency division multiple access (SC-FDMA) uplink (UL) transmission of PUSCH according to some embodiments of the present disclosure.

FIG. 10 illustrates the single-carrier frequency division multiple access (SC-FDMA) uplink (UL) transmission 1000 of PUSCH according to some embodiments of the present disclosure. The embodiment shown in FIG. 10 is for illustration only. Other embodiments could be used without departing from the scope of the present disclosure.

A data signal that passed through the coding chain 1005 and a control signal that passed through the coding chain 1006 are multiplexed 1010. Here the subcarrier mapping step maps the output of DFT precoder 1015 to a contiguous set of subcarriers at the input of the IFFT 1020. Typically the size of IFFT is greater than the size of DFT precoder.

Figure 11:
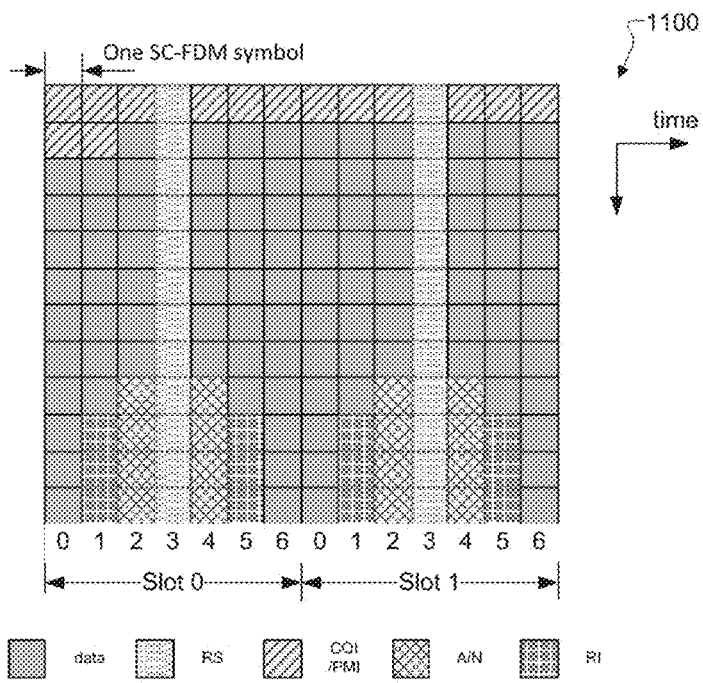
FIG. 11 illustrates multiplexing of data and control in LTE graphically according to some embodiments of the present disclosure.

One of the key component of this UL transmission is the data/control multiplexing. FIG. 11 illustrates multiplexing of data and control 1100 in LTE graphically according to some embodiments of the present disclosure, where:

RS (or DMRS, demodulation reference signals) are mapped on entire SC-FDM symbol #3 in both slots of 0 and 1;

CQI/PMI region: CQI/PMI are mapped onto vREs (virtual REs corresponding to a subcarrier and an SC-FDM symbol) comprising one-edge subcarriers of the assigned PUSCH BW;

A/N region: A/N (Ack/Nack) are mapped onto SC-FDM symbols #2 and #4 in both slots, and occupies consecutive subcarriers on the other edge; and RI region: RI are mapped onto SC-FDM symbols #1 and #5 in both slots, and occupies consecutive subcarriers on the other edge.

In this two dimensional grid, the output across all virtual subcarriers at a given SC-FDM symbol in time is collected and send to the DFT precoder shown in FIG. 11.

One CSI Process for the Long-Term and Short-Term CSI Reports

In some embodiments, eNB configures one CSI process for receiving the reports on long-term and short-term CSI. The one CSI process comprises a first and a second CSI-RS resources, one CSI-IM (or IMR), and at least one of periodic CSI reporting configuration(s) and aperiodic CSI reporting configuration(s).

In some embodiments, the CSI-IM (or IMR) is configured by means of a zero-power CSI-RS resource configuration.

In some embodiments, the first and the second CSI-RS (resources) are respectively referred to as non-precoded (NP) CSI-RS and beamformed (BF) CSI-RS.

In some embodiments, a CSI process to be configured for the UE may comprise at least one of a first and a second CSI-RS resources, one CSI-IM (or IMR), and at least one of a periodic CSI reporting configuration and an aperiodic CSI reporting configuration. Here, the first CSI-RS resource is for non-precoded CSI-RS, and the second CSI-RS resource is for beamformed CSI-RS.

For the UE configured with such a CSI process, the UE operation to derive CSI reports changes dependent upon whether the first CSI-RS resource or the second CSI-RS resource or both are configured.

Figure 12:
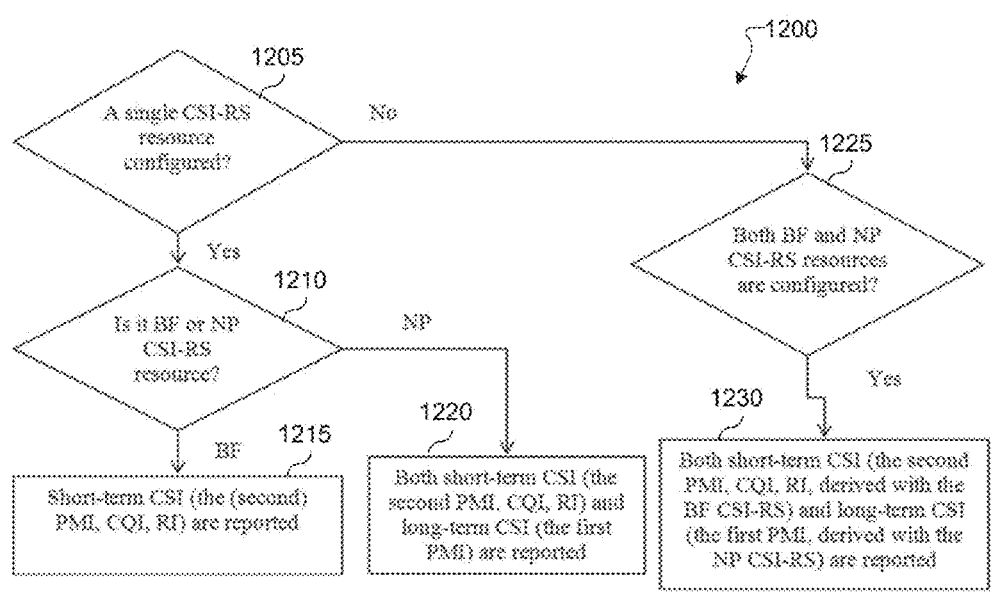
FIG. 12 illustrates UE operations to determine CSI reporting configuration according to some embodiments of the present disclosure.

FIG. 12 illustrates UE operations 1200 to determine CSI reporting configuration according to some embodiments of the present disclosure. The embodiment shown in FIG. 12 is for illustration only. Other embodiments could be used without departing from the scope of the present disclosure.

In the embodiments, UE determines whether a single CSI-RS resource is configured at step 1205, and if so, determines whether the single CSI-RS resource is BF or NP CSI-RS resource at step 1210.

When the UE is configured with only the first CSI-RS resource (non-precoded, NP CSI-RS) of the two, the UE derives 1210 both the long-term CSI (i.e., beam group indication, or the first PMI) and the short-term CSI (i.e., co-phase (and beam selection, when multiple beams configured), or the second PMI) using CSI-RS on the first CSI resource and the CSI-IM, and reports both the long-term CSI and short-term CSI.

When the UE is configured with only the second CSI-RS resource (beamformed, BF CSI-RS) of the two, the UE derives 1215 only the short-term CSI (i.e., co-phase (and beam selection)) using the CSI-IM and CSI-RS on the second CSI-RS resource, and reports only the short-term CSI.

When it is determined that the UE is configured with both the first (non-precoded) and the second CSI-RS resource (beamformed) at step 1225, the UE derives 1230 the long-term CSI (i.e., beam group indication, or the first PMI) using CSI-RS on the first CSI-RS resource, and the short-term CSI (i.e., co-phase (and beam selection), CQI, RI) using the CSI-IM and CSI-RS on the second CSI-RS resource, and reports both the long-term and short-term CSI.

In some embodiments, a UE configured with such a CSI process is configured to derive and report: (1) long-term CSI based upon channel estimates estimated with a first CSI-RS on the first CSI-RS resource, and (2) short-term CSI based upon channel and interference estimates estimated with a second CSI-RS on the second CSI-RS resource and the CSI-IM.

In some embodiments, a UE is configured with such a CSI process is configured to report both long-term CSI and short-term CSI on a single PUSCH, when triggered by an aperiodic CSI trigger in UL grant. The long-term CSI may comprise CDI indicator and the short-term CSI may comprise CQI/PMI/RI. In one alternative, the CDI indicator and the RI are mapped onto the LTE RI region as illustrated in FIG. 11. This is motivated by the fact that CDI indicator contains more important information for long-term adaptation such as CSI-RS beamforming. In another alternative, the CDI indicator is jointly encoded with the CQI/PMI and mapped onto the LTE CQI/PMI region as illustrated in FIG. 11.

In some embodiments, for such a CSI process, the transmission of the second CSI-RS is aperiodic. A UE can be configured to receive aperiodic CSI-RS. The UE configured with the aperiodic CSI-RS reception will separately receive an indication from the eNB about when to receive and process the second CSI-RS for the derivation and reporting of short-term CSI. The indication may be carried by the UL grant DCI in the PDCCH; or by the DL assignment DCI in the PDCCH.

In one alternative, the UE is configured to derive CSI utilizing channel estimates estimated with the CSI-RS transmitted in the same subframe as the UL grant DCI. As there will be DCI decoding delay, it may be better the CSI-RS in this case be mapped on to the second time slot of the subframe (i.e., slot 1) only, to prevent the UE from not being able to process the CSI-RS.

In another alternative, the UE is configured to derive CSI utilizing channel estimates estimated with the CSI-RS transmitted in the right next subframe (say subframe n+1) as the UL grant DCI (say subframe n). In this case the CSI-RS REs may reside in the first time slot of the subframe n+1.

In some embodiments, the indication may also trigger the UE to report aperiodic CSI—PMI/CQI/RI, as well as it indicates the transmission of the second CSI-RS.

In one alternative, the indication information is carried by a bit field in a DCI, which comprises a single bit to indicate whether or not to report the aperiodic CSI report derived with the second type of CSI-RS.

TABLE 14

| State of the bit field in the DCI | Meaning |
|---|---|
| 0 | No aperiodic CSI reporting |
| 1 | The UE to report aperiodic CSI derived with the indicated second CSI-RS. |

In another alternative, the indication information is jointly coded within a 2-bit aperiodic CSI trigger in a DCI, according to the following table:

TABLE 15

| State of the two-bit aperiodic CSI trigger | Meaning |
|---|---|
| 00 | No aperiodic CSI reporting |
| 01 | Report aperiodic CSI derived with the indicated second CSI-RS. |
| 10 | Report aperiodic CSI for a first set of CSI processes configured by the higher-layer |
| 11 | Report aperiodic CSI for a second set of CSI processes configured by the higher-layer |

Observation Interval for CQI Derivation

Figure 13:
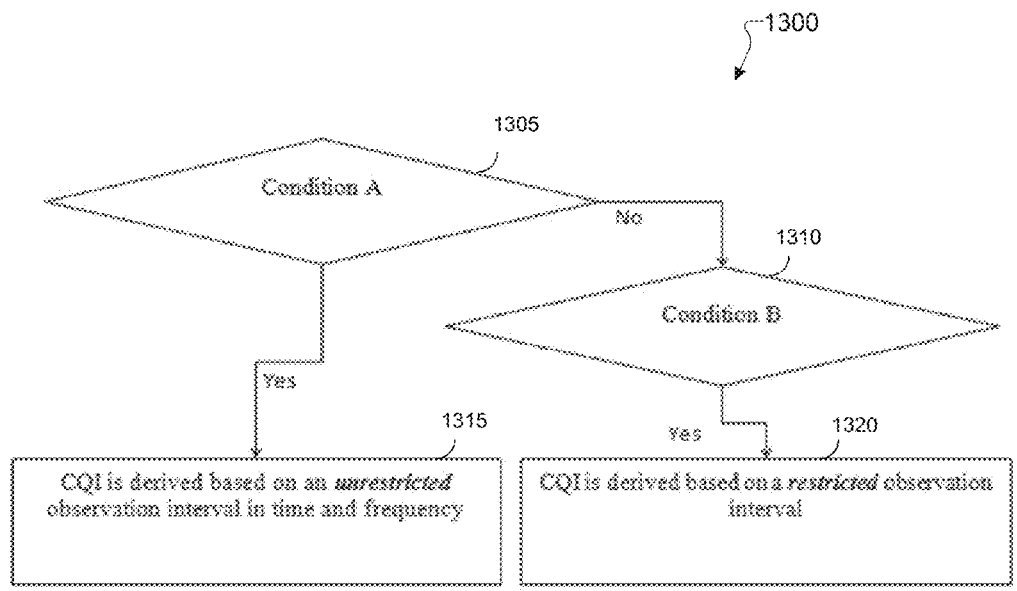
FIG. 13 shows UE operation to determine the definition of CQI according to some embodiments of the present disclosure.

FIG. 13 shows UE operation 1300 to determine the definition of CQI according to some embodiments of the present disclosure. The embodiment shown in FIG. 13 is for illustration only. Other embodiments could be used without departing from the scope of the present disclosure.

FIG. 13 states that if condition A is satisfied at step 1305, observation interval for CQI derivation is unrestricted 1315 in time and frequency. If condition B is satisfied instead at step 1310, observation interval for CQI derivation is restricted 1320.

In one such embodiment, Condition A corresponds to an event that the reference signal configured for the CQI is either CRS or NP CSI-RS; and condition B corresponds to an event that the reference signal configured for the CQI is BF CSI-RS, and the observation restriction applies in time (and frequency). When the UE is configured with only NP CSI-RS (i.e., without BF CSI-RS) or CRS for the CQI derivation, it is of the UE's best interest to derive the CQI according to its own best estimation algorithm; and hence it is proposed to allow the UE to use unrestricted observation. On the other hand, when the UE is configured with BF CSI-RS for the CQI derivation, eNB may adapt the beamforming vector of the BF CSI-RS in time (and frequency). Hence in order for the UE to reliably estimate the CQI, the UE should be configured to restrict the observation in time (and frequency).

In another such embodiment, a similar method as the previous embodiment can be constructed, with replacing the CRS, the NP and the BF CSI-RS respectively with their antenna port numbers. Condition A corresponds to an event that the antenna ports used for deriving the CQI is a subset of 0-3 and 15-30; and condition B corresponds to an event that the antenna ports used for deriving the CQI is a subset of $\{x, x+1, \ldots, x+7\}$, and the observation restriction applies in time (and frequency), wherein x is the minimum antenna port number (integer) defined for the BF CSI-RS and x>30. This embodiment applies when a new set of antenna port numbers is allocated for the BF CSI-RS.

Observation Restriction

In some embodiments, the UE is configured to restrict observation for CQI derivation.

In one alternative method, the restriction applies only in the time domain, and no restriction is applied to the frequency domain. This method provides reasonable flexibility of eNB beamforming, and at the same time channel estimation reliability and simplicity for the UE implementation. Several method can be devised to configure the UE to restrict the observation in the time domain (or configure an observation window in time domain):

in a first method, a single subframe is configured as an observation window, in which the corresponding BF CSI-RS is transmitted, for deriving the CQI; and in a second method, a set of subframes is configured as an observation window, where BF CSI-RS is transmitted in all of those subframes in the set. In one example, the UE is configured to receive BF CSI-RS in a designated set of subframes, which are configured in terms of period (in subframes) and a subframe offset. Then, the set of subframes comprising the observation window is configured in terms of two integers representing a period and an offset. In some embodiments, the period and the offset are defined in terms of the number of those subframes with BF CSI-RS within an observation window.

Figure 14:
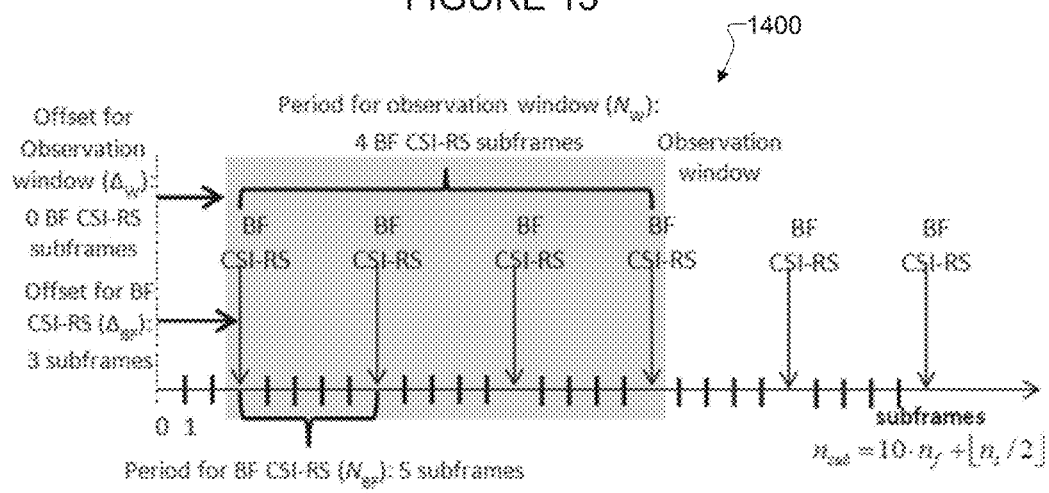
FIG. 14 illustrates an example definition of observation window according to some embodiments of the present disclosure.

FIG. 14 illustrates an example definition of observation window 1400 according to some embodiments of the present disclosure. The embodiments shown in FIG. 14 are for illustration only. Other embodiments could be used without departing from the scope of the present disclosure.

The BF CSI-RS is transmitted with a period of 5 subframes and a subframe offset of 3 subframes; in this case, the BF CSI-RS is transmitted on those subframes satisfying the following condition:

$$(10n_f + \lfloor n_s/2 \rfloor - \Delta_{BF}) \bmod N_{BF} = 0,$$

where $\Delta_{BF}$ is the subframe offset for the BF CSI-RS, $N_{BF}$ is the period, $n_s$ is the slot number; and $n_f$ is the system frame number (SFN).

It is noted that $10n_f + \lfloor n_s/2 \rfloor$ is called a subframe index ($n_{sub}$) in some embodiments of the present disclosure.

The observation window is defined in terms of an observation-window period ($N_W$) and observation-window offset $\Delta_W$, which can be configured by the higher layer (RRC). In the figure, $\Delta_W = 0$ and $N_W = 4$, which are in terms of numbers of BF-CSI-RS subframes. A new observation-window starts when the subframe index satisfies the following condition:

$$(10n_f + \lfloor n_s/2 \rfloor - \Delta_{BF} - N_{BF} \cdot \Delta_W) \bmod (N_W \cdot N_{BF}) = 0.$$

CQI DEFINITION

Based on the observation interval determined in such a way, the UE shall derive for each CQI value reported in uplink subframe n the highest CQI index between 1 and 15 in TABLE 7.2.3-1 or TABLE 7.2.3-2 in 3GPP TS 36.213 which satisfies the following condition, or CQI index 0 if CQI index 1 does not satisfy the condition: A single PDSCH transport block with a combination of modulation scheme and transport block size corresponding to the CQI index, and occupying a group of downlink physical resource blocks termed the CSI reference resource, could be received with a transport block error probability not exceeding 0.1.

New TM

In some embodiments, a new TM X is introduced as a transmission mode for FD-MIMO, whose main characteristics is e.g., more than 2 orthogonal DMRS ports for MU-MIMO; and/or a new CSI process that can comprise both NP and BF CSI-RS, wherein NP CSI-RS comprises 8, 12 or 16 antenna ports.

Reference Signals Used for Deriving CQI

In the legacy specification 3GPP TS36.213, for TM10, the following is specified for the reference signal used for deriving CQI.

For a UE in transmission mode 10, the UE shall derive the channel measurements for computing the CQI value reported in uplink subframe n and corresponding to a CSI process, based on only the non-zero power CSI-RS (defined in [3]) within a configured CSI-RS resource associated with the CSI process.

For a UE in transmission mode 10, the UE shall derive the interference measurements for computing the CQI value reported in uplink subframe n and corresponding to a CSI process, based on only the configured CSI-IM resource associated with the CSI process. If the UE in transmission mode 10 is configured by higher layers for CSI subframe sets $C_{CSI,0}$ and $C_{CSI,1}$ for the CSI process, the configured CSI-IM resource within the subframe subset belonging to the CSI reference resource is used to derive the interference measurement. For a UE configured with the parameter EIMTA-MainConfigServCell-r12 for a serving cell, configured CSI-IM resource(s) within only downlink subframe(s) of a radio frame that are indicated by UL/DL configuration of the serving cell can be used to derive the interference measurement for the serving cell.

Figure 15:
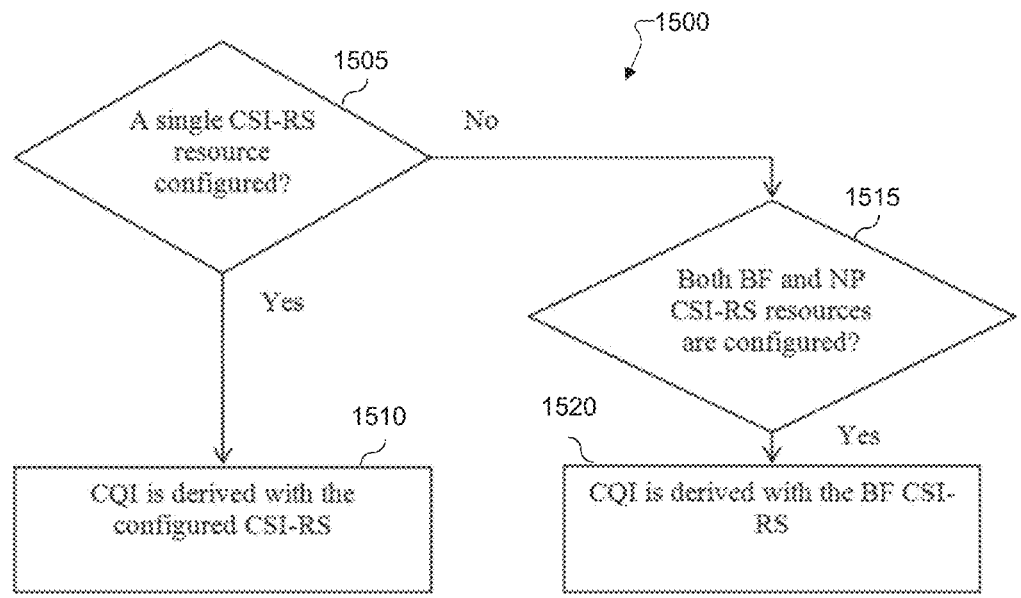
FIG. 15 illustrates the configuration of reference signals to derive CQI according to some embodiments of the present disclosure.

FIG. 15 illustrates the configuration 1500 of reference signals to derive CQI according to some embodiments of the present disclosure. The embodiment shown in FIG. 15 is for illustration only. Other embodiments could be used without departing from the scope of the present disclosure.

When the new types of CSI-RS and the new TM (i.e., TM X) are introduced, the reference signal to derive CQI should also be clarified according to some embodiments of the present disclosure.

In the embodiments as illustrated in FIG. 15, for a UE in transmission mode X configured with a CSI process comprising both the NP CSI-RS and the BF CSI-RS as illustrated in step 1515, the UE shall derive 1520 the channel measurements for computing the CQI value reported in uplink subframe n and corresponding to the CSI process, based on only the NZP CSI-RS within the BF CSI-RS resource associated with the CSI process. For a UE in transmission mode X configured with a CSI process comprising a single CSI-RS as illustrated in step 1505, the UE shall derive 1510 the channel measurements for computing the CQI value reported in uplink subframe n and corresponding to a CSI process, based on only the configured NZP CSI-RS associated with the CSI process. Or, for a UE in transmission mode X, the UE shall derive the interference measurements for computing the CQI value reported in uplink subframe n and corresponding to a CSI process, based on only the configured CSI-IM resource associated with the CSI process.

In another embodiment, for a UE in transmission mode X configured with the NP CSI-RS without the BF CSI-RS, the UE shall derive the channel measurements for computing the CQI value reported in uplink subframe n and corresponding to a CSI process, based on only the non-zero power CSI-RS within a configured NP CSI-RS resource associated with the CSI process.

For a UE in transmission mode X configured with the BF CSI-RS (including two cases: only BF CSI-RS is configured, or both BF and NP CSI-RS are configured), the UE shall derive the channel measurements for computing the CQI value reported in uplink subframe n and corresponding to a CSI process, based on only the non-zero power CSI-RS within a configured BF CSI-RS resource associated with the CSI process. Or, for a UE in transmission mode X, the UE shall derive the interference measurements for computing the CQI value reported in uplink subframe n and corresponding to a CSI process, based on only the configured CSI-IM resource associated with the CSI process.

PMI Derivation and Reporting

In the legacy specification 3GPP TS 36.213, the following is specified on the UE behavior of PMI derivation and reporting.

For transmission modes 9 and 10, the UE shall report PMI if configured with PMI/RI reporting and the number of CSI-RS ports is larger than 1. A UE shall report PMI based on the feedback modes described in 7.2.1 and 7.2.2. For other transmission modes, PMI reporting is not supported.

Figure 16:
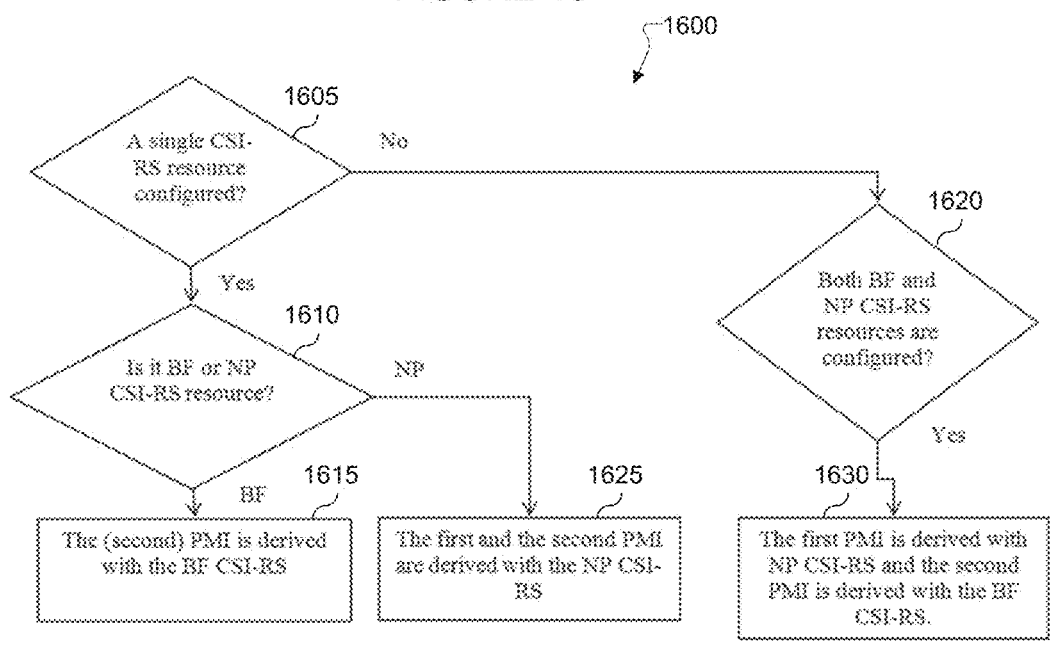
FIG. 16 illustrates the UE operation to determine RS for deriving PMI according to some embodiments of the present disclosure.

FIG. 16 illustrates the UE operation 1600 to determine RS for deriving PMI according to some embodiments of the present disclosure. The embodiment shown in FIG. 16 is for illustration only. Other embodiments could be used without departing from the scope of the present disclosure.

In the embodiments, the UE behavior of PMI derivation and reporting with TM 10 is described as follows. UE determines whether a single CSI-RS resource is configured at step 1605, and if so, determines whether the single CSI-RS resource is BF or NP CSI-RS resource at step 1610. For transmission modes X, the UE shall report PMI if the number of CSI-RS ports of either NP or BF CSI-RS resource is larger than 1. If it is determined at step 1620 that both NP and BF CSI-RS resource are configured, the first PMI (beam group selection) is derived with only the NP CSI-RS, and the second PMI (beam selection within a beam group and co-phase selection) is derived with the BF CSI-RS in step 1630. For the second PMI and CQI, RI derivation, UE should make use of only the BF CSI-RS and CSI-IM (without NP CSI-RS). In some embodiments, the UE is configured to derive the second PMI only (without the first PMI), when deriving CQI based upon BF CSI-RS at step 1615. In some embodiments, the UE is configured to derive the first and second PMI with NP CSI-RS at step 1625.

It is noted that the hybrid CSI-RS and related CSI reporting is supported according to embodiments of the present disclosure. Hybrid CSI-RS is configured when the UE is configured with both the beamformed and the non-precoded CSI-RS. The second PMI, RI and CQI are derived with the beamformed CSI-RS and CSI-IM (according to the description for the CQI definition and for the PMI reporting behavior). The first PMI is derived with only the non-precoded CSI-RS (according to the description for the PMI reporting behavior).

Hybrid CSI Process

In some embodiments, a UE is configured with a CSI process comprising two CSI-RS resources: (1) a composite non-precoded CSI-RS resource, and (2) a beamformed CSI-RS resource. In one such embodiment, the composite non-precoded CSI-RS resource comprises two component CSI-RS resources: a first non-precoded CSI-RS resource and a second non-precoded CSI-RS resource. The CSI process configuration according to these embodiments is summarized in the following: a composite non-precoded CSI-RS resource including:

a first non-precoded (class A') CSI-RS resource to be used for derivation of $i_{11}$;

a second non-precoded (class A') CSI-RS resource to be used for derivation of $i_{12}$ configuration of the CSI-RS transmission period and offset; and other CSI-RS configuration parameters.

In one such embodiment, a common CSI-RS transmission period and offset is configured for the two non-precoded CSI-RS resources.

In some alternative embodiments, a UE is configured with a CSI process comprising three CSI-RS resources: a first non-precoded CSI-RS resource, a second non-precoded CSI-RS resource and a beamformed CSI-RS resource. The CSI process configuration according to these embodiments is summarized in the following:

a first non-precoded (class A') CSI-RS resource containing CSI-RS configuration parameters used for derivation of i11;

a second non-precoded (class A') CSI-RS resource containing CSI-RS configuration parameters used for derivation of i12; and a beamformed (class B) CSI-RS resource containing CSI-RS configuration parameters used for derivation of i2, CQI/RI.

In one such embodiment, CSI-RS configuration parameters are separately configured for each of the three CSI-RS resources.

In these embodiments, CSI-RS configuration parameters include a CSI-RS transmission period and offset, parameter Pc (the power ratio between the CSI-RS and the Physical Data Shared Channel (PDSCH)), CSI-RS RE mapping pattern indicator (i.e., CSI reference signal configuration in TS 36.211), number of antenna ports, and the like. Further, separate codebooks are associated/configured with class A' and class B CSI feedback.

The UE is further configured to report PMI i11, i12 and i2 after measuring channels using the CSI-RS on the non-precoded and the precoded CSI-RS resources. In one such embodiment, the PMI corresponds to a precoding vector according to a following equation:

$$W_{l,m,n}^{(1)} = \frac{1}{\sqrt{P}} \begin{bmatrix} v_{l,m} \\ \varphi_n v_{l,m} \end{bmatrix}, \quad \text{Eqn. 1}$$

wherein $l=i_{11}, m=i_{12}, n=i_2$, and P=the number of CSI-RS antenna ports, and;

$$\varphi_n = e^{j\pi n/2} \quad \text{Eqn. 2}$$

$$u_m = \begin{bmatrix} 1 & e^{j\frac{2\pi m}{O_2 N_2}} & \ldots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T.$$

Here, candidate values for $N_1$ and $N_2$ include 1, 2, 4 and 8, 16, 32, 48, 64.

Non-Precoded (Class A') CSI-RS and Class A' CSI Reporting

In some embodiments, the UE is configured to derive i11 and i12 using the first and the second non-precoded (class A') CSI-RS of the configured CSI process.

The UE is also configured with N1 and N2, respectively correspond to the length of the oversampled DFT vectors corresponding to i11 and i12, to derive the precoders for the PMI feedback. Two alternative embodiments are presented below.

In one embodiment, the UE is configured to use explicitly & separately indicated values of N1 and N2 in the higher layer from the number of CSI-RS ports NCSI-RS,1 and NCSI-RS,2 for the first and the second component CSI-RS.

In another embodiment, the UE is configured to implicitly derive N1 and N2 using the numbers of CSI-RS ports configured for the first and the second non-precoded CSI-RS resources.

The UE also needs to be configured with the (class A') precoder codebooks for deriving i11 and i12. In one such embodiment, the UE is configured to use rank-1 codebooks. Two embodiments are presented below. In these embodiments, the UE is also configured with the oversampling factors O1 and O2 in the higher layer.

In one embodiment, N1=NCSI-RS,1 and N2=NCSI-RS,2, and the UE is configured to use (1) an N1-port PMI codebook and (2) an N2-port PMI codebook respectively to derive the PMI, i.e., i11 and i12. In one example, the precoders of the two codebooks are represented by, respectively:

$$w_l = \begin{bmatrix} 1 & e^{j\frac{2\pi l}{O_1 N_1}} & \ldots & e^{j\frac{2\pi l(N_1-1)}{O_1 N_1}} \end{bmatrix}, l = 0, 1, \ldots, O_1 N_1 - 1; \quad \text{Eqn. 3}$$

$$u_m = \begin{bmatrix} 1 & e^{j\frac{2\pi m}{O_2 N_2}} & \ldots & e^{j\frac{2\pi m(N_2-1)}{O_2 N_2}} \end{bmatrix}, m = 0, 1, \ldots, O_2 N_2 - 1; \quad \text{Eqn. 4}$$

wherein $l=i_{11}, m=i_{12}$, and the UE derives $i_{11}$ and $i_{12}$ respectively using the channels measured by the first and the second component CSI-RS.

In another embodiment, $N_1 = N_{CSI-RS,1}/2$ and $N_2 = N_{CSI-RS,2}/2$; and the UE is configured to use a $2N_x$-port PMI codebook to derive the PMI, $i_{1x}$, x=1, 2. One example codebook is shown in the below table.

TABLE 16

| Value of Codebook- | | $i_2$ | | | |
|---|---|---|---|---|---|
| Config | $i_{1,x}$ | 0 | 1 | 2 | 3 |
| 1 | 0, 1, ..., $O_x N_x - 1$ | $W_{i_{1,x},0}^{(1)}$ | $W_{i_{1,x},1}^{(1)}$ | $W_{i_{1,x},2}^{(1)}$ | $W_{i_{1,x},3}^{(1)}$ |

$$\phi_n = e^{j\pi n/2}$$

Here, $$W_{m,n}^{(1)} = \frac{1}{\sqrt{P}} \begin{bmatrix} v_m \\ \varphi_n v_m \end{bmatrix}, \text{ and } v_m = \begin{bmatrix} 1 & e^{j\frac{2\pi m}{O_x N_x}} & \ldots & e^{j\frac{2\pi m(N_x-1)}{O_x N_x}} \end{bmatrix}^T.$$

In this case, the PMI $i_{1x}$ corresponds to an oversampled DFT vector of $v_{i_{1x}}$.

Beamformed CSI-RS and Class B CSI Reporting

In some embodiments, the UE is configured to derive i2 and CQI/RI using the beamformed CSI-RS of the configured CSI process.

The K number of CSI-RS resources for the beamformed CSI-RS resource is 1, and hence, the UE is configured to 'Class B' codebook according to 'PMI-config'=1.

In one alternative embodiment, the 2L number of antenna ports for the beamformed CSI-RS is explicitly configured, wherein L=1, 2, 4. The UE derives PMI i2 accordingly, with utilizing the 2L port codebook.

In another alternative embodiment, the 2L number of antenna ports for the beamformed CSI-RS is implicitly configured, according to the Codebook-Config. When Codebook-Config=1, L=1; and when Codebook-Config=2, 3, 4, L=4. The UE derives PMI i2 accordingly, with utilizing the 2L port codebook.

Figure 17:
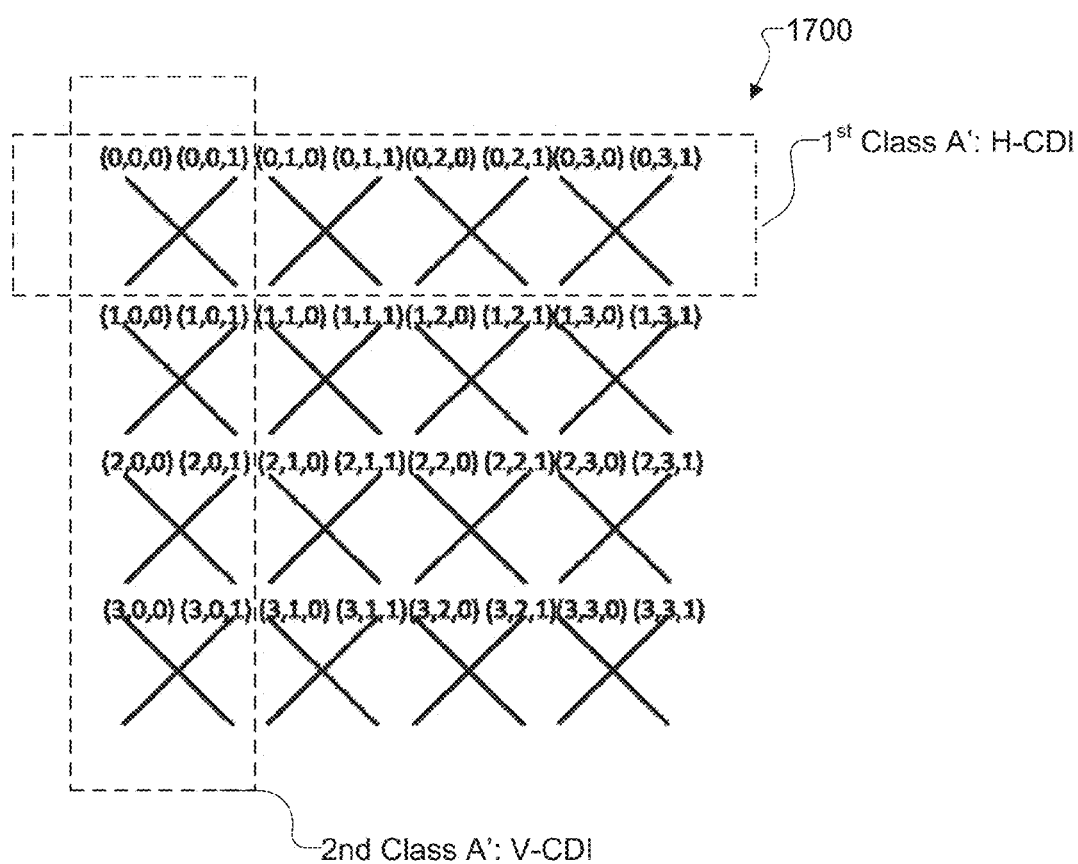
FIG. 17 illustrates an example CSI process where a UE is configured with a CSI process comprising three CSI-RS resources.

FIG. 17 illustrates an example CSI process where a UE is configured with a CSI process comprising three CSI-RS resources: a first non-precoded CSI-RS resource, a second non-precoded CSI-RS resource and a beamformed CSI-RS resource according to embodiments of the present disclosure. The embodiment shown in FIG. 17 is for illustration only. Other embodiments could be used without departing from the scope of the present disclosure.

The first non-precoded (the first Class A') CSI-RS resource contains a CDI for one row antennas of a two-dimension antenna array. This CDI can be named as a Horizontal-CDI, or H-CDI. FIG. 17 illustrates that the first non-precoded CSI-RS resource represents the first row antennas of a two-dimension antenna array. However, the first Class A' resource can represent any row of a two-dimension antenna array. A UE receives the first Class A' resource from the base station, and uses it for derivation of i11.

The second non-precoded (the second Class A') CSI-RS resource contains a CDI for one column antennas of a two-dimension antenna array. This CDI can be named as a Vertical-CDI, or V-CDI. FIG. 17 illustrates that the second Class A' resource represents the first column antennas of a two-dimension antenna array. However, the second Class A' resource can represent any row of a two-dimension antenna array. A UE receives the first Class A' resource from the base station, and uses it for derivation of i11.

The beamformed CSI-RS (Class B) resource contains a CDI for a co-phase ($\phi_p$) between two oversampled DFT vectors ($u_n$, $v_m$) that are identified by i11 and i12, respectively. A UE receives the second non-precoded CSI-RS (Class B) resource from the base station, and uses it for derivation of i2.

The UE is reports PMI i11, i12 and i2 after measuring channels using the CSI-RS on the non-precoded and the precoded CSI-RS resources.

Periodic and Aperiodic CSI Reporting for the Hybrid CSI Process

For periodic and aperiodic CSI reporting of PMI $i_{11}$, $i_{12}$ and $i_2$ and CQI/RI derived according to these embodiments related to hybrid CSI process, the UE can be configured with Rel-13 class A PUCCH feedback modes (namely, mode 1-1 and mode 2-1) for periodic reporting; and Rel-13 class A PUSCH feedback modes.

To aid the Patent Office and any readers of any patent issued on this application in interpreting the claims appended hereto, applicants wish to note that they do not intend any of the appended claims or claim elements to invoke 35 U.S.C. §112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. §112(f).

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A user equipment (UE) capable of communicating with a base station (BS), the UE comprising:
    a transceiver configured to:
        receive a signal comprising a channel state information (CSI) process configuration, wherein the CSI process configuration comprises a plurality of channel state information-reference signal (CSI-RS) resource configurations to identify CSI-RS resources; and
    a controller configured to:
        derive first precoding matrix indicator (PMI) indices $i_{11}$ and $i_{12}$ utilizing a non-precoded CSI-RS on a non-precoded CSI-RS resource;
        derive a second PMI index $i_2$ utilizing a beamformed CSI-RS on a beamformed CSI-RS resource; and
        cause the transceiver to transmit a CSI feedback comprising the PMI indices $i_{11}$, $i_{12}$ and $i_2$ to the base station.

2. The UE of claim 1, wherein the non-precoded CSI-RS comprises a first CSI-RS and a second CSI-RS, and the UE is configured to derive $i_{11}$ from the first CSI-RS and $i_{12}$ from the second CSI-RS.

3. The UE of claim 1, wherein:
    the UE is configured to use an $N_1$-port PMI codebook and an $N_2$-port PMI codebook respectively to derive $i_{11}$ and $i_{12}$; and
    $N_1$ and $N_2$ are positive integers.

4. The UE of claim 3, wherein the UE is configured with $N_1$ and $N_2$ in a higher layer, wherein $N_1$ and $N_2$ respectively represent a number of non-precoded CSI-RS ports and a number of second non-precoded CSI-RS ports.

5. The UE of claim 3, wherein the UE is configured with $2N_1$ and $2N_2$ in a higher layer, wherein $2N_1$ and $2N_2$ respectively represent a number of first non-precoded CSI-RS ports and a number of second non-precoded CSI-RS ports.

6. The UE of claim 3, wherein a $N_1$-port PMI precoder, $w_l$, comprising the $N_1$-port PMI codebook and a $N_2$-port PMI precoder $u_m$, comprising the $N_2$-port PMI codebook, are represented as follows:

$$w_l = \left[1 \ e^{j\frac{2\pi l}{O_1 N_1}} \ \ldots \ e^{j\frac{2\pi l(N_1-1)}{O_1 N_1}}\right], l = 0, 1, \ldots, O_1 N_1 - 1; \text{ and}$$

$$u_m = \left[1 \ e^{j\frac{2\pi m}{O_2 N_2}} \ \ldots \ e^{j\frac{2\pi m(N_2-1)}{O_2 N_2}}\right], m = 0, 1, \ldots, O_2 N_2 - 1$$

where $O_1$ and $O_2$ are oversampling factors, configured in a higher layer.

7. The UE of claim 1, wherein the UE is configured to use an 2L-port PMI codebook to derive $i_2$, wherein a value of 2L is configured in a higher layer, wherein L=1, 2, or 4.

8. A base station capable of communicating with a user equipment (UE), the base station comprising:
    a transmitter configured to transmit a signal comprising a channel state information (CSI) process configuration, wherein the CSI process configuration comprises a plurality of channel state information-reference signal (CSI-RS) resource configurations to indicate a plurality of CSI-RS resources comprising:
        a non-precoded CSI-RS resource carrying a non-precoded CSI-RS to be used for derivation of first precoding matrix indicator (PMI) indices $i_{11}$ and $i_{12}$; and
        a beamformed CSI-RS resource carrying a beamformed CSI-RS to be used for derivation of a second PMI index $i_2$;
    a receiver configured to receive a CSI feedback comprising the PMI indices $i_{11}$, $i_{12}$ and $i_2$ from the UE; and
    a controller configured to identify a precoder matrix according to a codebook based on the CSI feedback.

9. The base station of claim 8, wherein the non-precoded CSI-RS comprises a first CSI-RS to be used for derivation of $i_{11}$ and a second CSI-RS to be used for derivation of $i_{12}$.

10. The base station of claim 8, wherein:
    the UE is configured to use an $N_1$-port PMI codebook and an $N_2$-port PMI codebook respectively to derive $i_{11}$ and $i_{12}$; and
    $N_1$ and $N_2$ are positive integers.

11. The base station of claim 10, wherein the UE is configured with $N_1$ and $N_2$ in a higher layer, wherein $N_1$ and $N_2$ respectively represent a number of first non-precoded CSI-RS ports and a number of second non-precoded CSI-RS ports.

12. The base station of claim 10, wherein the UE is configured with $2N_1$ and $2N_2$ in a higher layer, wherein $2N_1$ and $2N_2$ respectively represent a number of first non-precoded CSI-RS ports and a number of second non-precoded CSI-RS ports.

13. The base station of claim 10, wherein a $N_1$-port PMI precoder, $w_l$, comprising the $N_1$-port PMI codebook and a $N_2$-port PMI precoder $u_m$, comprising the $N_2$-port PMI codebook, are represented as follows:

$$w_l = \begin{bmatrix} 1 & e^{j\frac{2\pi l}{O_1 N_1}} & \cdots & e^{j\frac{2\pi l(N_1-1)}{O_1 N_1}} \end{bmatrix}, l = 0, 1, \ldots, O_1 N_1 - 1; \text{ and}$$

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix}, m = 0, 1, \ldots, O_2 N_2 - 1$$

where $O_1$ and $O_2$ are oversampling factors, configured in a higher layer.

14. The base station of claim 8, wherein the UE is configured to use an 2L-port PMI codebook to derive $i_2$, wherein a value of 2L is configured in a higher layer, wherein L=1, 2, or 4.

15. A method for communicating with a user equipment (UE), the method comprising:
   transmitting a signal comprising a channel state information (CSI) process configuration, wherein the CSI process configuration configures the UE with a plurality of channel state information-reference signal (CSI-RS) resource configurations to identify a plurality of CSI-RS resources comprising:
      a non-precoded CSI-RS resource carrying a non-precoded CSI-RS to be used for derivation of first precoding matrix indicator (PMI) indices $i_{11}$ and $i_{12}$; and
      a beamformed CSI-RS resource carrying a beamformed CSI-RS to be used for derivation of a second index $i_2$;
   receiving a CSI feedback comprising the PMI indices $i_{11}$, $i_{12}$ and $i_2$ from the UE; and
   identifying a precoder matrix according to a codebook based on the CSI feedback.

16. The method of claim 15, wherein the non-precoded CSI-RS comprises a first CSI-RS to be used for derivation of $i_{11}$ and a second CSI-RS to be used for derivation of $i_{12}$.

17. The method of claim 15, wherein:
   the UE is configured to use an $N_1$-port PMI codebook and an $N_2$-port PMI codebook respectively to derive $i_{11}$ and $i_{12}$; and
   $N_1$ and $N_2$ are positive integers.

18. The method of claim 17, wherein the UE is configured with $N_1$ and $N_2$ in a higher layer, wherein $N_1$ and $N_2$ respectively represent a number of first non-precoded CSI-RS ports and a number of second non-precoded CSI-RS ports.

19. The method of claim 17, wherein the UE is configured with $2N_1$ and $2N_2$ in a higher layer, wherein $N_1$ and $N_2$ respectively represent a number of first non-precoded CSI-RS ports and a number of second non-precoded CSI-RS ports.

20. The method of claim 17, wherein a $N_1$-port PMI precoder, $w_l$, comprising the $N_1$-port PMI codebook and a $N_2$-port PMI precoder $u_m$, comprising the $N_2$-port PMI codebook, are represented as follows:

$$w_l = \begin{bmatrix} 1 & e^{j\frac{2\pi l}{O_1 N_1}} & \cdots & e^{j\frac{2\pi l(N_1-1)}{O_1 N_1}} \end{bmatrix}, l = 0, 1, \ldots, O_1 N_1 - 1; \text{ and}$$

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix}, m = 0, 1, \ldots, O_2 N_2 - 1$$

where $O_1$ and $O_2$ are oversampling factors, configured in a higher layer.

* * * * *